United States Patent [19]
Haskins

[11] Patent Number: 6,064,969
[45] Date of Patent: *May 16, 2000

[54] FLEXIBLE ANNUITY SETTLEMENT PROPOSAL GENERATING SYSTEM

[75] Inventor: Charles R. Haskins, Wyoming, Del.

[73] Assignee: Citicorp Life Insurance Company, Dover, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/525,037

[22] Filed: Sep. 8, 1995

Related U.S. Application Data

[63] Continuation of application No. 08/156,761, Nov. 24, 1993, abandoned.

[51] Int. Cl.⁷ .............................................. G06F 157/00
[52] U.S. Cl. ................................................................ 705/4
[58] Field of Search ............................... 364/401, 406, 364/408; 395/203, 202; 283/54; 705/1–3

[56] References Cited

U.S. PATENT DOCUMENTS

| | | | |
|---|---|---|---|
| 3,634,669 | 1/1972 | Soumas et al. | 235/184 |
| 3,749,892 | 7/1973 | Stenning | 235/184 |
| 4,055,757 | 10/1977 | Tillman et al. | 364/408 |
| 4,334,270 | 6/1982 | Towers | 364/300 |
| 4,642,768 | 2/1987 | Roberts | 364/408 |
| 4,722,055 | 1/1988 | Roberts | 364/408 |
| 4,750,119 | 6/1988 | Cohen et al. | 364/401 |
| 4,750,121 | 6/1988 | Halley et al. | 364/408 |
| 4,831,526 | 5/1989 | Luchs et al. | 364/401 |
| 4,969,094 | 11/1990 | Halley et al. | 364/408 |
| 5,136,502 | 8/1992 | Van Remortel et al. | 364/401 |
| 5,189,608 | 2/1993 | Lyons et al. | 364/408 |
| 5,220,500 | 6/1993 | Baird et al. | 364/408 |
| 5,222,019 | 6/1993 | Yoshino et al. | 364/408 |
| 5,231,571 | 7/1993 | D'Agostino | 364/408 |
| 5,245,536 | 9/1993 | Hsieh | 364/408 |
| 5,291,398 | 3/1994 | Hagan | 364/408 |

OTHER PUBLICATIONS

The Purchased life annuity–Not so Boring After All Planned Savings (PSVGS), Aug. 27, 1990 p.: 31–35, Dialog file 772, Accession No. 05149511.

Brian Potter, "The Role of Annuities in Life Assurance Insurance Age (IAGE)", Apr. 24, 1990, p.:24, Dialog file 772, Accession No. 04647289.

"Life Support Plus 4.2", DataPro Accession No. 00242936, Vendor: Genelco, Inc., Dialog file 751, Accession No. 00242936.

Lawrence et al, "Taylor Your Coverage to Changing Needs (Life Insurance) . . . ", Medical Economics, v 68, n 20, p 51 (8), Dialog File 148, Acc. #05527396, Oct. 1991.

Akira, "Sales System and Information Processing System to Execute and Operate the Same", Mar. 3, 1995, Japan Abstract.

*Primary Examiner*—Frantzy Poinvil
*Attorney, Agent, or Firm*—Morgan & Finnegan, L.L.P.

[57] ABSTRACT

An investment system includes a computer-implemented annuity system generating annuity proposals for customers. The annuity system includes a memory storing customer information input from a customer and annuity information, and a processor, connected to the memory. The processor retrieves the customer and annuity information from the memory, and generates an annuity proposal responsive to the customer and annuity information. According to the annuity system, the annuity proposal includes one of fixed period installments, life, joint and survivor, joint and contingent and proceeds at interest annuities. The proceeds at interest annuity may also be viewed as a flexible Certificate of Deposit (CD) investment proposal for use by companies providing banking services.

11 Claims, 18 Drawing Sheets

| | | | | |
|---|---|---|---|---|
| Current Settlement Option Proposal | | Citicorp Life Insurance Company | | |
| | | Agent: Joe Agent | | DJV |
| Annuitant: John A. Doe | | | | |
| Birth Date: 10/1/28  Age: 65 | | | | |
| Risk Class: Male | | | | |
| Effective Date: 10/1/93 | | Proposal Number: | CIG0000100 | |
| Annuity Type: Single Life | | Annuity With Life Contingencies 12 Years of Certain Payments | | |
| Consideration: | $100,000.00 | | $0.00 =Premium Tax Deducted | |
| Benefit Payment Mode: | Monthly | | | |
| Initial Benefit Amount: | $462.42 | | | |
| Amount of Annual Increase: | $18.50 | | Fixed Percentage Increase of: 4.00% | |

| Benefit Year | GUARANTEED Monthly Benefit Payment | GUARANTEED Total Annual Payment | GUARANTEED Cumulative Benefit Payment | Investment Yield |
|---|---|---|---|---|
| 1 | $462.42 | $5,549.04 | $5,549.04 | |
| 2 | $480.92 | $5,771.04 | $11,320.08 | |
| 3 | $499.42 | $5,993.04 | $17,313.12 | |
| 4 | $517.92 | $6,215.04 | $23,528.16 | |
| 5 | $536.42 | $6,437.04 | $29,965.20 | |
| 6 | $554.92 | $6,659.04 | $36,624.24 | |
| 7 | $573.42 | $6,881.04 | $43,505.28 | |
| 8 | $591.92 | $7,103.04 | $50,608.32 | |
| 9 | $610.42 | $7,325.04 | $57,933.36 | |
| 10 | $628.92 | $7,547.04 | $65,480.40 | |
| 11 | $647.42 | $7,769.04 | $73,249.44 | |
| 12 | $665.92 | $7,991.04 | $81,240.48 | N/A |

FIG. 12

| | | | | |
|---|---|---|---|---|
| Current Settlement Option Proposal | | Citicorp Life Insurance Company | | |
| | | Agent: Joe Agent | | DJV |
| Annuitant: John A. Doe | | | | |
| Birth Date: 10/1/28 Age: 65 | | | | |
| Risk Class: Male | | | | |
| Effective Date: | | Proposal Number: | CIG0000100 | |
| Annuity Type: Single Life | Annuity With Life Contingencies 12 Years of Certain Payments | | | |
| Consideration: | $100,000.00 | | 0.00% =Premium Tax Deducted | |
| Benefit Payment Mode: | Monthly | | | |
| Initial Benefit Amount: | $462.42 | | | |
| Amount of Annual Increase: | $18.50 | | Fixed Percentage Increase of: 4.00% | |

[PAYMENTS MADE DURING THE LIFETIME OF THE ANNUITANT]

| Benefit Year | Monthly Benefit Payment | Total Annual Payment | Cumulative Benefit Payment | Investment Yield |
|---|---|---|---|---|
| 13 | $684.42 | $8,213.04 | $89,453.52 | N/A |
| 14 | $702.92 | $8,435.04 | $97,888.56 | N/A |
| 15 | $721.42 | $8,657.04 | $106,545.60 | 0.49% |
| 16 | $739.92 | $8,879.04 | $115,424.64 | 1.48% |
| 17 | $758.42 | $9,101.04 | $124,525.68 | 2.31% |
| 18 | $776.92 | $9,323.04 | $133,848.72 | 3.02% |
| 19 | $795.42 | $9,545.04 | $143,393.76 | 3.63% |
| 20 | $813.92 | $9,767.04 | $153,160.80 | 4.16% |
| 21 | $832.42 | $9,989.04 | $163,149.84 | 4.63% |
| 22 | $850.92 | $10,211.04 | $173,360.88 | 5.03% |
| 23 | $869.42 | $10,433.04 | $183,793.92 | 5.39% |
| 24 | $887.92 | $10,655.04 | $194,448.96 | 5.70% |
| 25 | $906.42 | $10,877.04 | $205,326.00 | 5.98% |
| 26 | $924.92 | $11,099.04 | $216,425.04 | 6.22% |
| 27 | $943.42 | $11,321.04 | $227,746.08 | 6.44% |
| 28 | $961.92 | $11,543.04 | $239,289.12 | 6.64% |
| 29 | $980.42 | $11,765.04 | $251,054.16 | 6.81% |
| 30 | $998.92 | $11,987.04 | $263,041.20 | 6.97% |
| 31 | $1,017.42 | $12,209.04 | $275,250.24 | 7.11% |
| 32 | $1,035.92 | $12,431.04 | $287,681.28 | 7.24% |
| 33 | $1,054.42 | $12,653.04 | $300,334.32 | 7.36% |
| 34 | $1,072.92 | $12,875.04 | $313,209.36 | 7.46% |
| 35 | $1,091.42 | $13,097.04 | $326,306.40 | 7.55% |
| 36 | $1,109.92 | $13,319.04 | $339,625.44 | 7.64% |

Note: Payments Continue, if Annuitant is Living.

FIG. 13

| | | | | | |
|---|---|---|---|---|---|
| Current Settlement Option Proposal | | | Citicorp Life Insurance Company | | |
| | | Agent: Joe Agent | | | DVM |
| Annuitant: | John A. Doe | | | | |
| Birth Date: | 10/1/28 | Age: 65 | | | |
| Risk Class: | Male | | | | |
| | | Consideration: $100,000.00 | | | |
| Proposal Number: | CIG0000100 | | | | Paid |
| Effective Date: | 10/1/93 | | Benefit of: | $383.05 | Monthly |
| Annuity Type: | Single Life | | Proceeds at Interest for | 12 | Years |
| | Repayment of Consideration Made on: | 10/1/2005 | | | |

| Benefit Year | GUARANTEED Monthly Benefit Payment | GUARANTEED Total Annual Payment | GUARANTEED Cumulative Benefit Payment | Investment Yield |
|---|---|---|---|---|
| 1 | $383.05 | $4,596.60 | $4,596.60 | |
| 2 | $383.05 | $4,596.60 | $9,193.20 | |
| 3 | $383.05 | $4,596.60 | $13,789.80 | |
| 4 | $383.05 | $4,596.60 | $18,386.40 | |
| 5 | $383.05 | $4,596.60 | $22,983.00 | |
| 6 | $383.05 | $4,596.60 | $27,579.60 | |
| 7 | $383.05 | $4,596.60 | $32,176.20 | |
| 8 | $383.05 | $4,596.60 | $36,772.80 | |
| 9 | $383.05 | $4,596.60 | $41,369.40 | |
| 10 | $383.05 | $4,596.60 | $45,966.00 | |
| 11 | $383.05 | $4,596.60 | $50,562.60 | |
| 12 | $383.05 | $4,596.60 | $55,159.20 | 4.71% |

FIG. 18 ered and claimed, with reference being had to the
FLEXIBLE ANNUITY SETTLEMENT PROPOSAL GENERATING SYSTEM This is a continuation of application Ser. No. 08/156,761, filed on Nov. 24, 1993 now abandoned.

BACKGROUND OF THE INVENTION

1. Field of the Invention

The present invention relates generally to the field of flexible customer proposal generation systems, and more particularly, to an annuity system which enables customers to design flexible annuity or Certificate of Deposit (CD) settlement options, and single premium immediate annuity benefits, while providing the company generating the proposal with a detailed allocation of proceeds by investment duration.

2. Description of the Related Art

Current annuity and CD systems provide the customer with a limited amount of features which crudely determine the requested type of program. For instance, an annuity proposal with a fixed period installments is typically based upon a single interest rate. In addition, the current annuity and CD proposals also do not factor in actual costs but provide a very crude estimate on the costs of the proposal to the company, resulting in a vague, unsupported charge to the customer.

Current annuity and CD proposals also are not developed interactively and simultaneously in front of the customer so that the customer will receive the proposal while the customer waits. Further, the existing annuity and CD systems do not prepare an investment matching report for the company indicating what types of investments are necessary over the payment period of the proposal for the company to safely cover the proposal from a business perspective.

Thus, it is desirable to provide a more accurate annuity or CD proposal generation system which more accurately determines and generates the customer proposal. It is also desirable to provide a recommended investment schedule which provides the company selling the annuity or CD proposal with a detailed description of the necessary investments and rate of return to ensure that the annuity or CD proposal is adequately financed.

Further, it is also desirable to allow the customer to cater or alter the annuity or CD proposal to the specific needs of the customer. That is, it is desirable that the customer be allowed to designate the payment period of the annuity or CD as well as any guaranteed investment return.

SUMMARY OF THE INVENTION

It is therefore an object of the present invention to provide a more accurate annuity or CD proposal generation system which more accurately determines and generates the customer proposal. It is also an object of the present invention to provide a recommended investment schedule or an investment matching table which provides the company selling the annuity or CD proposal with a detailed description of the necessary investments and rate of return to ensure that the annuity or CD proposal is adequately financed.

Further, it is an object of the present invention to allow the customer to cater or alter the annuity or CD proposal to the specific needs of the customer. That is, it is desirable that the customer be allowed to designate the payment period of the annuity or CD as well as any guaranteed investment return.

The present invention implements and administers an insurance product proposal for a flexible annuity settlement option or proposal and single premium immediate annuity values. The present invention enables customers to design flexible annuity settlement options and single premium immediate annuity benefits, while providing the insurance company with a detailed allocation of proceeds by investment duration.

In addition to creating an unlimited degree of benefit flexibility, the present invention enables many unique features to be offered for the first time to traditional purchasers of annuities and certificates of deposits, as noted below. For example, one of the features of the present invention, Proceeds at Interest, can also be used in a banking environment for implementing and administering a bank program of flexible certificate of deposits.

The present invention also calculates the exact amount of benefit payments to be made to annuitants or holder of certificates of deposit and determines yield on investment for the certificate holder depending on the years payments are made. The system uses investment yield information for a series of investment maturities and also aids the fund manager in making decisions regarding investment of fund assets in order to meet future benefit payment obligations of the insurance company or bank.

To achieve these and other objects, the investment system of the present invention includes a computer-implemented annuity system generating annuity proposals for customers. The annuity system includes a memory storing customer information input from a customer and annuity information, and a processor, connected to the memory. The processor retrieves the customer and annuity information from the memory, and generates an annuity proposal responsive to the customer and annuity information. According to the annuity system of the present invention, the annuity proposal includes one of fixed period installments, life, joint and survivor, joint and contingent and proceeds at interest annuities.

These, together with other objects and advantages which will be subsequently apparent, reside in the details of construction and operation as more fully hereinafter described and claimed, with reference being had to the accompanying drawings forming a part hereof, wherein like numerals refer to like elements throughout.

BRIEF DESCRIPTION OF THE DRAWINGS

FIGS. 12–13 are sample product proposals generated by the annuity system of the present invention for options A–D;

FIG. 18 is a sample product proposals generated by the CD system of the present invention for Option E.

DESCRIPTION OF THE PREFERRED EMBODIMENTS

Figure 1:
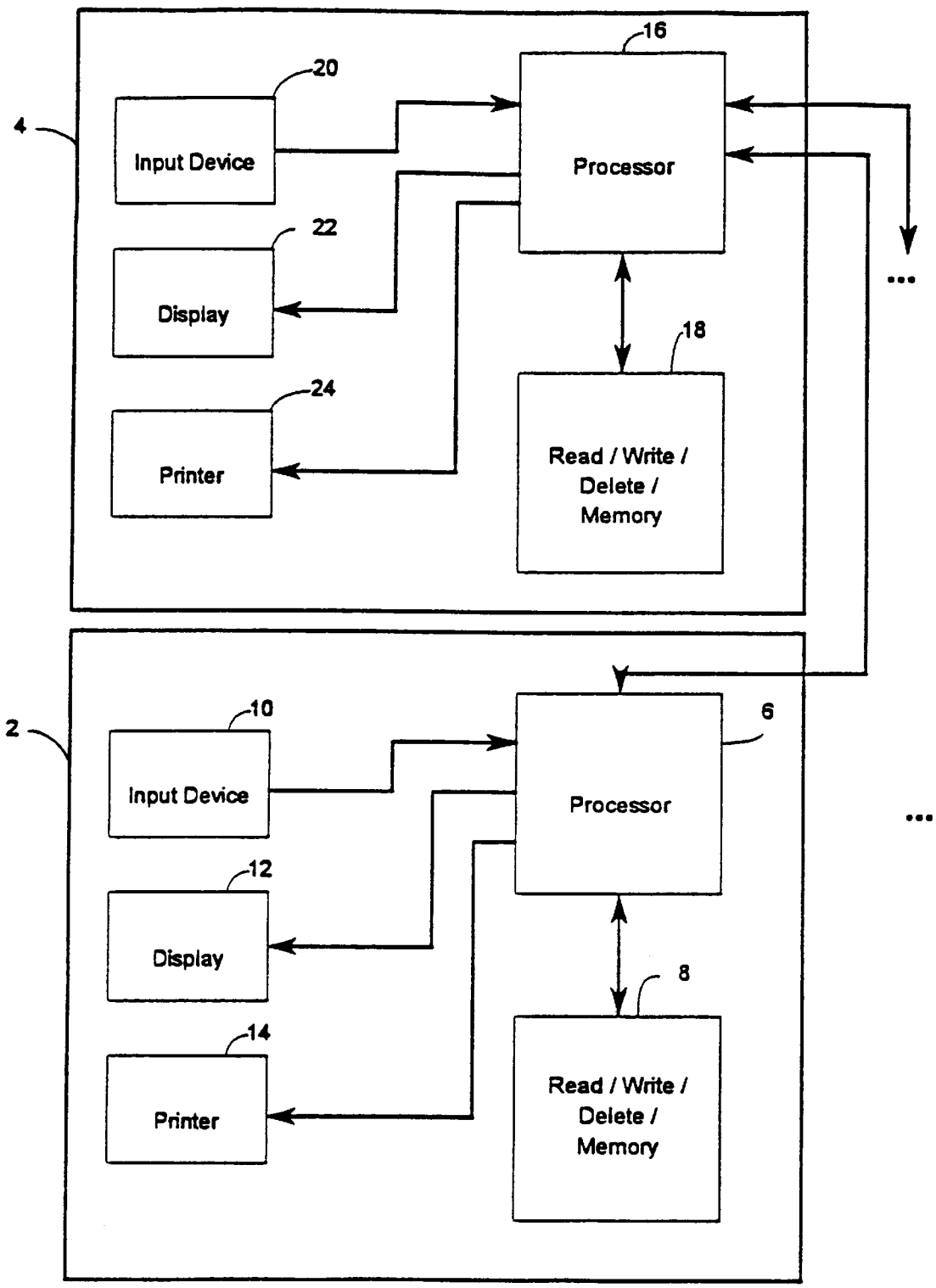
FIG. 1 is a block diagram of the basic structure of the annuity system of the present invention.

The present invention enables many unique features to be offered for the first time to traditional purchasers of annuities and certificates of deposits. An overview of the unique features is discussed below.

Calculation Process

A detailed calculation process involving all pricing parameters is conducted as part of each rate quote in the present invention. Other companies offering current settlement options use factors that depend on the risk class and the type of settlement option. These factors are applied based on the options selected and are usually based upon a predetermined rate per $1,000 of proceeds invested. Thus, these factors are not typically based upon the amount of the investment or multiple interest rates for different investment durations. However, the present invention provides a more accurate annuity or CD proposal by, for example, utilizing multiple interest rates based upon investment amount and duration. Further, the present invention considers actual maintenance costs in the determination of the proposals.

Investment Matching

A detailed listing of investment duration and estimated yield for investments which will match the cash flow needs of the proposal is generated. Other annuity generating proposal systems typically do not generate this information as part of the proposal, and therefore, are unable to accurately determine the appropriate investments which must be made to cover the cost of the proposals. Instead, other companies typically generate projected cash flow streams on all, none or a sample of existing policies, after the fact.

Investment Yield to the Annuitant

Another feature of the annuity system of the present invention, is that the system generates a detailed listing by year of investment yield for the annuitant. Other companies typically generate this data only on proceeds held at interest.

Specified Number of Years Certain

The annuity system of the present invention also provides the customer with the feature of specifying the number of years certain, i.e., the number of years for guaranteed investment return, from 0 to 30 on all settlement options. Other companies will typically only allows the customer to specify a limited period certain between 0 to 30, such as period certain for 5, 10 15, 20, 25 or 30 years. Further, the selection of the number of years certain is typically not available for Joint and Joint and Contingent settlement options. However, the present invention permits any number of years between 0 and 30, and provides this feature even for. Joint and Joint and Contingent settlement options.

Specified Fixed Annual Increase in Benefit Amount

Another feature of the present invention is the ability to permit the customer to select a fixed or compounded annual increase in the benefit payment on all options except Proceeds Held at Interest. Further, this feature may be easily expanded to allow for annuitant specified special amounts for selected durations. Other companies do not currently offer this option.

Flexible Certificate of Deposit

Finally, a flexible certificate of deposit (CD) may also be determined and displayed for the customer while the customer waits using the present invention. The flexible certificate of deposit also permits the bank customer to select the number of payment years, typically any year from 5 to 30, and the mode or frequency of interest payments (annual, semi-annual, quarterly or monthly). The interest rate on the certificate of deposit will vary according to these inputs, as well as the amount of the deposit. Accordingly, the bank customer will be able to cater the CD proposal to their specific investment requirements. Other banks do not offer this flexibility for generating CDs.

FIG. 1 is a block diagram of the basic structure of the annuity system of the present invention. In FIG. 1, customer location annuity system 2 and other customer location annuity systems are preferably connected to a central or home office annuity system 4. Customer location annuity system 2 preferably performs all the necessary processes required for generating an annuity or product proposal. Thus, customer location annuity system 2 includes input device 10 for receiving the customer selected features for the product proposal which are displayed to the customer on display 12, as well as printer 14 for printing a copy of the product proposal upon approval by the customer. Input device 10, display 12 and printer 14 are standard accessories for most computer systems.

Processor 6 is also included in customer location annuity system 2 for performing the procedures of the present invention which allow the customer to selectively determine various features which result in a customer selected product or annuity proposal. Processor 6 is conventional, and may be, for example, an IBM compatible 386 type processor with 2 MB of random access memory (RAM) and from 2 to 5 MB of read/write/delete storage such as a standard hard disk.

Processor 6 may also be linked to home office annuity system 4 via processor 16 to transmit the annuity proposals which have been accepted and completed by the customer. Thus, home office annuity system 4 will be provided with the necessary information in order to determine, for example, the appropriate home office reserve which is necessary by law or appropriate under the circumstances to ensure the security of customer investments. Home office annuity system 4 may also include read/write/delete memory 18, input device 20, display 22 and printer 24 for storing, inputting and displaying current investment yield, pricing parameter, mortality rate tables. When home office annuity system updates any of the above tables, processor 16 may also automatically update read/write/delete memory 8 of customer location annuity system accordingly so that the annuity proposals are generated based upon current interest rates, maintenance expenses, etc.

Figure 2:
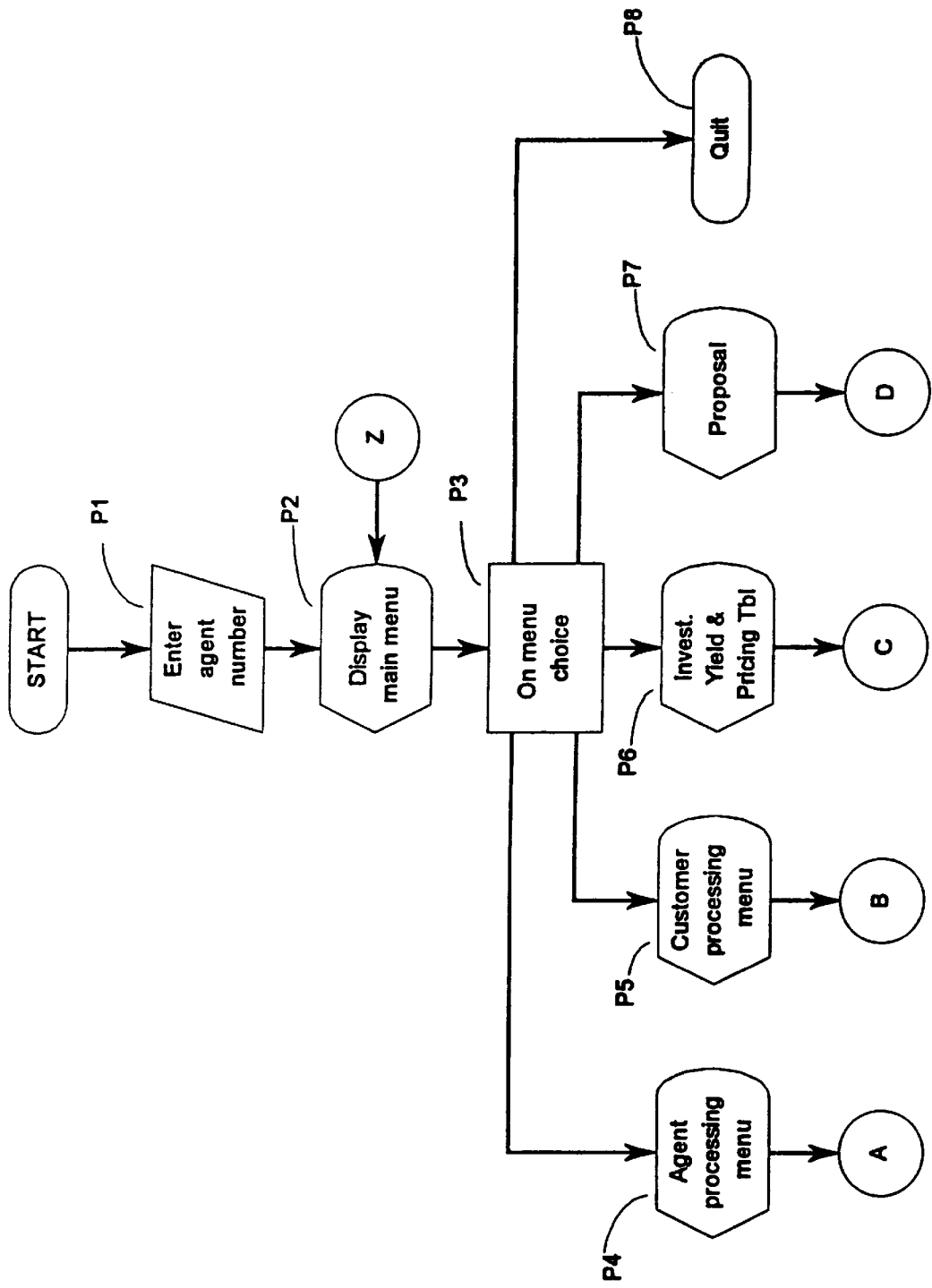
FIG. 2 is a flowchart of the main menu listing the various annuity options of the annuity system of the present invention.

FIGS. 2–6 are flowcharts of the basic user interface options of the present invention and depict the process flows that are used to generate the annuity or product proposals. FIG. 2 is a flowchart of the main menu listing the various annuity options of the annuity system of the present invention. The process is initiated by processor 6 displaying a request to enter an agent number in step P1. Once the agent number is input via input device 10, the main menu is displayed on display 12 by processor 6 which is retrieved from read/write/delete memory 8 in step P2. The main menu lists 5 product proposal options. The first four options in steps P4–P7 initiate process flows as detailed below in FIGS. 3–6. The fifth option, step P8, is to quit, or stop the process.

Figure 3:
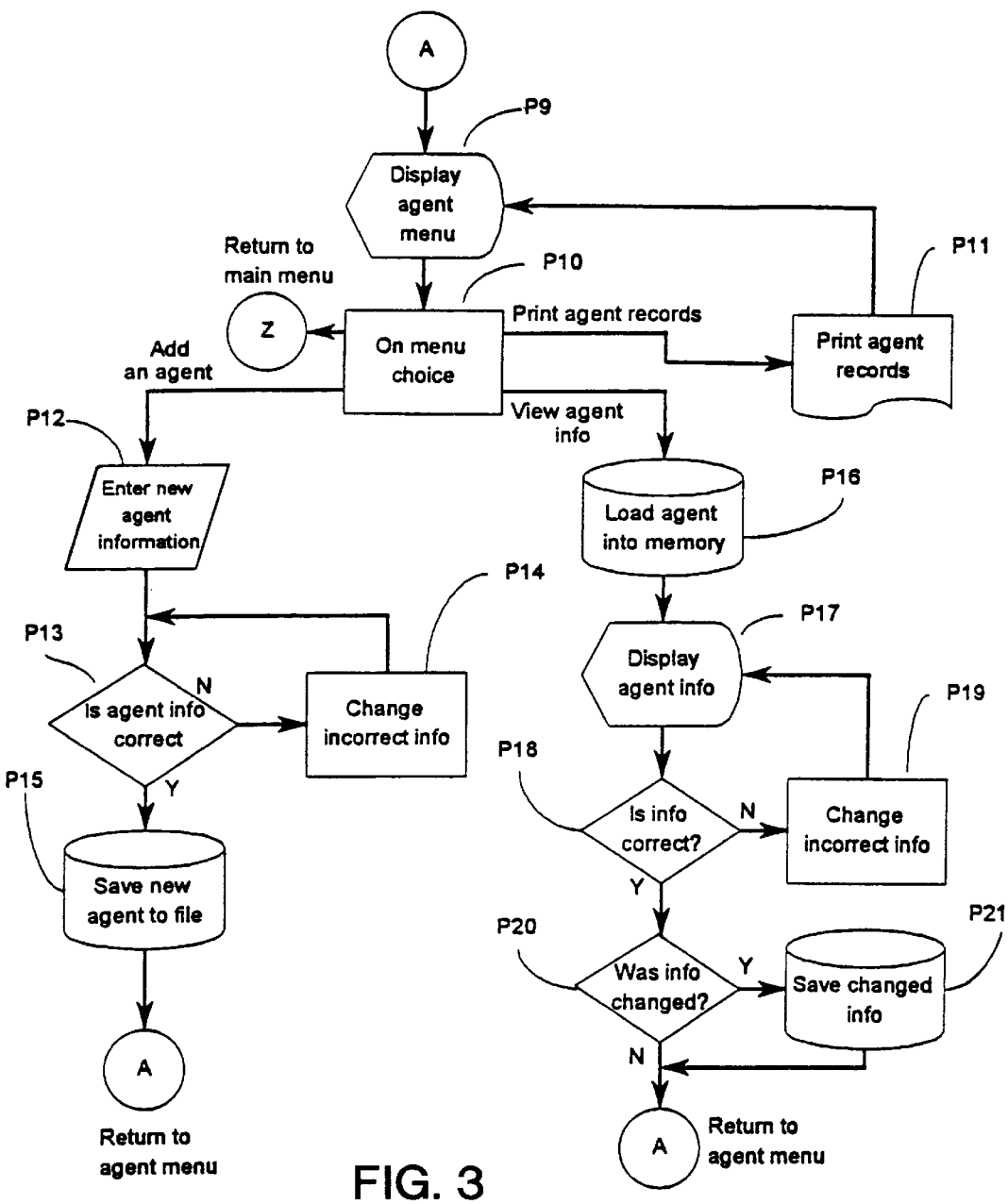
FIG. 3 is a flowchart of the agent processing procedure of the annuity system of the present invention.

FIG. 3 is a flowchart of the agent processing procedure of the annuity system of the present invention. When the user selects via input device 10 the agent processing menu in step P4 of FIG. 2, processor 6 displays the agent menu stored in read/write/delete memory 8 on display 12 in step P10. As shown in FIG. 3, a new agent description may be added in steps P12–P15. In addition, agent information may be viewed on display 12 or an existing description may be altered via steps P16–P21. Finally, the agent information may be printed on printer 24 in step P11. One example of the agent information which is compiled or entered may be the following:
1. AGENT NAME
2. AGENT ADDRESS
3. AGENT PHONE NUMBER
4. AGENT FAX NUMBER
5. AGENT CODE NUMBER
6. BRANCH NUMBER
7. BRANCH ADDRESS
8. PROFESSIONAL DESIGNATIONS (NASD REG., CLU, CFP, . . . )

Figure 4:
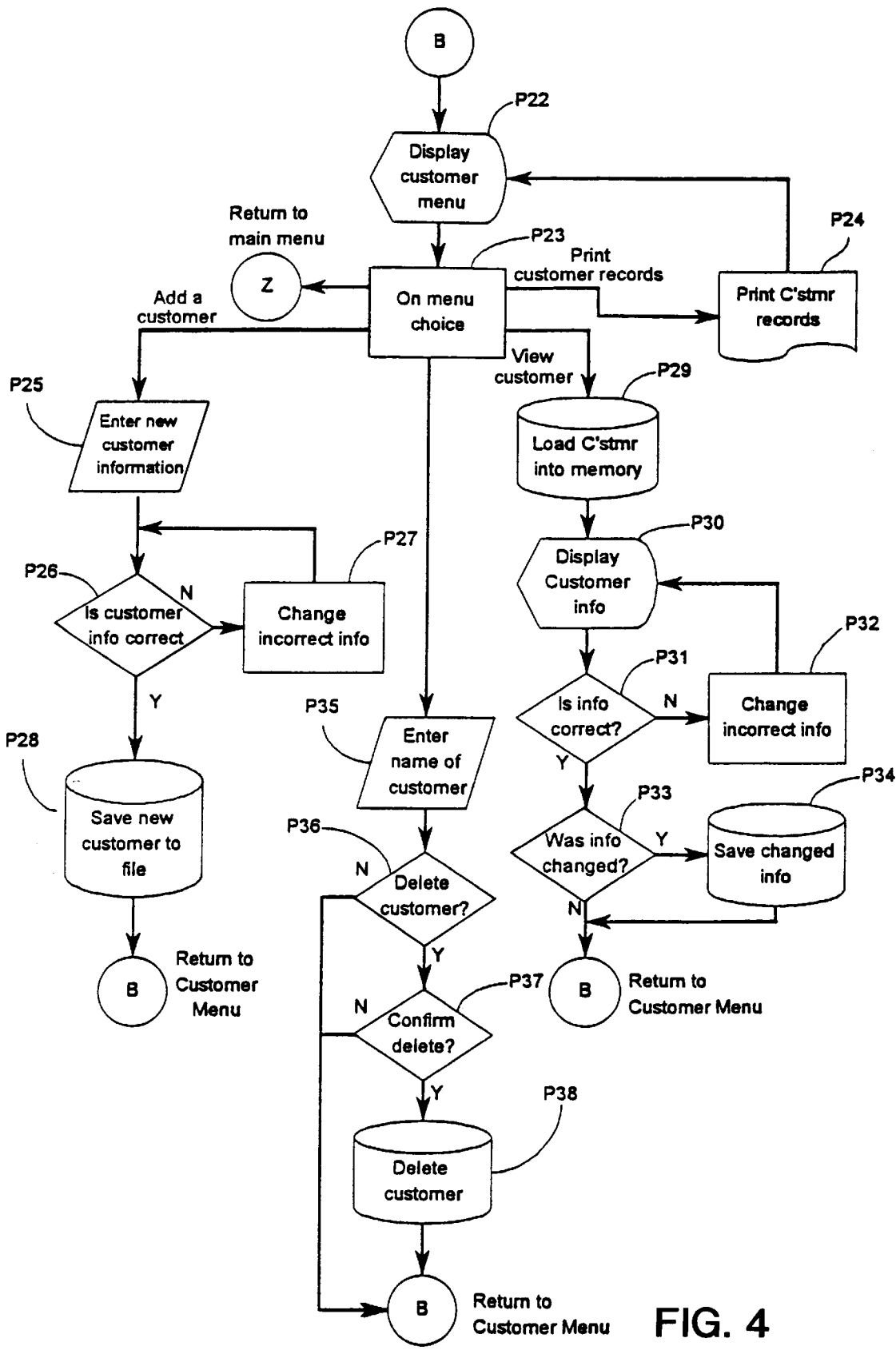
FIG. 4 is a flowchart of the customer processing procedure of the annuity system of the present invention.

FIG. 4 is a flowchart of the customer processing procedure of the annuity system of the present invention. When the user selects via input device 10 the customer processing menu in step P5 of FIG. 2, processor 6 displays the customer menu stored in read/write/delete memory 8 on display 12 in step P23. As shown in FIG. 4, processor 6 performs steps P25–P28 for entering new customer information, processor 6 performs steps P35–P38 for deleting customer information, and processor 6 performs steps P29–P34 for viewing customer information on display 12, and for altering customer information. In addition, customer information may be printed on printer 14 in step P24. One example of the customer information which is compiled or entered may be the following:
1. AGENT NUMBER
2. ANNUITANT NAME (LAST NAME FIRST)
3. ANNUITANT SEX
4. DATE OF BIRTH
5. SOCIAL SECURITY NUMBER
6. ADDRESS LINE #1
7. ADDRESS LINE #2
8. CITY
9. STATE
10. ZIP CODE
11. HOME PHONE NUMBER
12. WORK PHONE NUMBER
13. BEST TIME/PLACE TO CALL
14. NOTES/COMMENTS
15. OWNER NAME (IF DIFFERENT FROM ANNUITANT)
16. JOINT ANNUITANT NAME
17. JOINT ANNUITANT SEX
18. JOINT ANNUITANT DATE OF BIRTH
19. JOINT ANNUITANT SOCIAL SECURITY #

Figure 5:
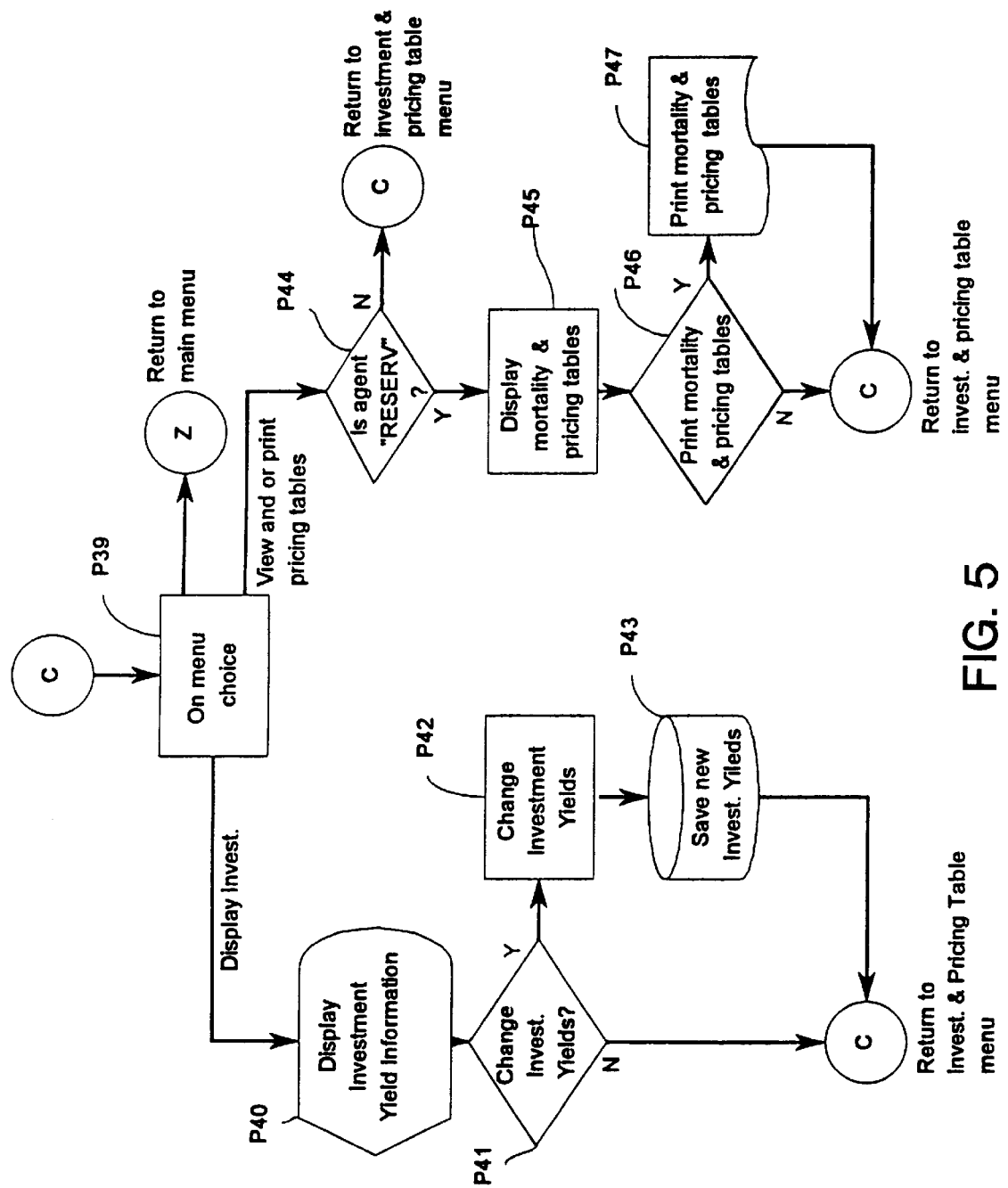
FIG. 5 is a flowchart of the current investment yield and pricing procedure of the annuity system of the present invention.

FIG. 5 is a flowchart of the current investment yield and pricing procedure of the annuity system of the present invention. When the user selects via input device 10 the investment menu in step P6 of FIG. 2, processor 6 displays the investment menu stored in read/write/delete memory 8 on display 12 in step P39. As shown in FIG. 5, processor 6 performs steps P40–P43 for displaying investment yield information, and for changing investment yield information responsive to update instructions generated by the home office.

In addition, processor 6 performs steps P44–P47 typically only when the user is the home office for viewing current confidential information such as profits derived from various annuity proposals, expense assumptions, mortality rates and mortality improvement factors. These confidential pricing factors cannot be updated by agents. Steps P44–P47 performed by processor 6 are used for displaying, printing or altering pricing and investment information. One example of the investment information which is compiled or entered may be the following:

| | | Investment Yield Information | | |
| --- | --- | --- | --- | --- |
| Benefit Years | Maturity Year | Treasury Yield 10/27/93 | Additional B.P. 10/25/93 | Estimated Gross Yield |
| 1 to 2 | 1 | 3.44% | 0.53% | 3.97% |
| 3 to 4 | 3 | 4.19% | 0.53% | 4.72% |
| 5 to 6 | 5 | 4.77% | 0.68% | 5.45% |
| 7 to 10 | 7 | 5.03% | 1.25% | 6.28% |
| 11 to 20 | 10 | 5.41% | 1.35% | 6.76% |
| 21 to 30 | 20 | 5.71% | 1.35% | 7.06% |
| 31 to 50 | 30 | 6.00% | 1.35% | 7.35% |

| Pricing Parameters | |
| --- | --- |
| Issue Cost | $100.00 |
| Annual Maintenance | $40.00 |
| Maintenance Inflation | 4.00% |
| Issue Comm. | 3.50% |
| Renewal Comm. % BP | 0.25% |
| Inv. & Risk Charge % BP | 0.40% |
| Profit & Surplus Charge | 1.00% |

| | Mortality Rates | | | | | |
| --- | --- | --- | --- | --- | --- | --- |
| Age | Male 1,000 Qx | Male Factor | Female 1,000 Qx | Female Factor | Unisex 1,000 Qx | Unisex Factor |
| 5 | 0.419 | 1.50 | 0.215 | 1.50 | 0.317 | 1.50 |
| 6 | 0.389 | 1.50 | 0.178 | 1.50 | 0.284 | 1.50 |
| 7 | 0.370 | 1.50 | 0.149 | 1.50 | 0.260 | 1.50 |
| 8 | 0.391 | 1.25 | 0.149 | 1.40 | 0.270 | 1.33 |
| 9 | 0.409 | 1.00 | 0.151 | 1.30 | 0.280 | 1.15 |
| 10 | 0.424 | 0.75 | 0.156 | 1.20 | 0.290 | 0.98 |
| 11 | 0.438 | 0.50 | 0.163 | 1.10 | 0.301 | 0.80 |
| Table continuing . . . | | | | | | |
| 110 | 663.417 | 1.00 | 602.115 | 1.25 | 632.766 | 1.13 |
| 111 | 720.626 | 1.00 | 665.676 | 1.25 | 693.151 | 1.13 |
| 112 | 782.640 | 1.00 | 736.725 | 1.25 | 759.683 | 1.13 |
| 113 | 849.708 | 1.00 | 815.782 | 1.25 | 832.745 | 1.13 |
| 114 | 922.077 | 1.00 | 903.367 | 1.25 | 912.722 | 1.13 |
| 115 | 1,000.000 | 0.00 | 1,000.000 | 0.00 | 1,000.000 | 0.00 |

It should be noted that the investment yields used in this example are based upon the duration of investment for treasury securities plus additional basis point margins equivalent to a BBB corporate security. However, the investment yields may also be based on other factors including security classifications or investment categories, such as commercial mortgages, real estate or government insured mortgages. Accordingly, each security classification may entail different investment risk charges.

Figure 6:
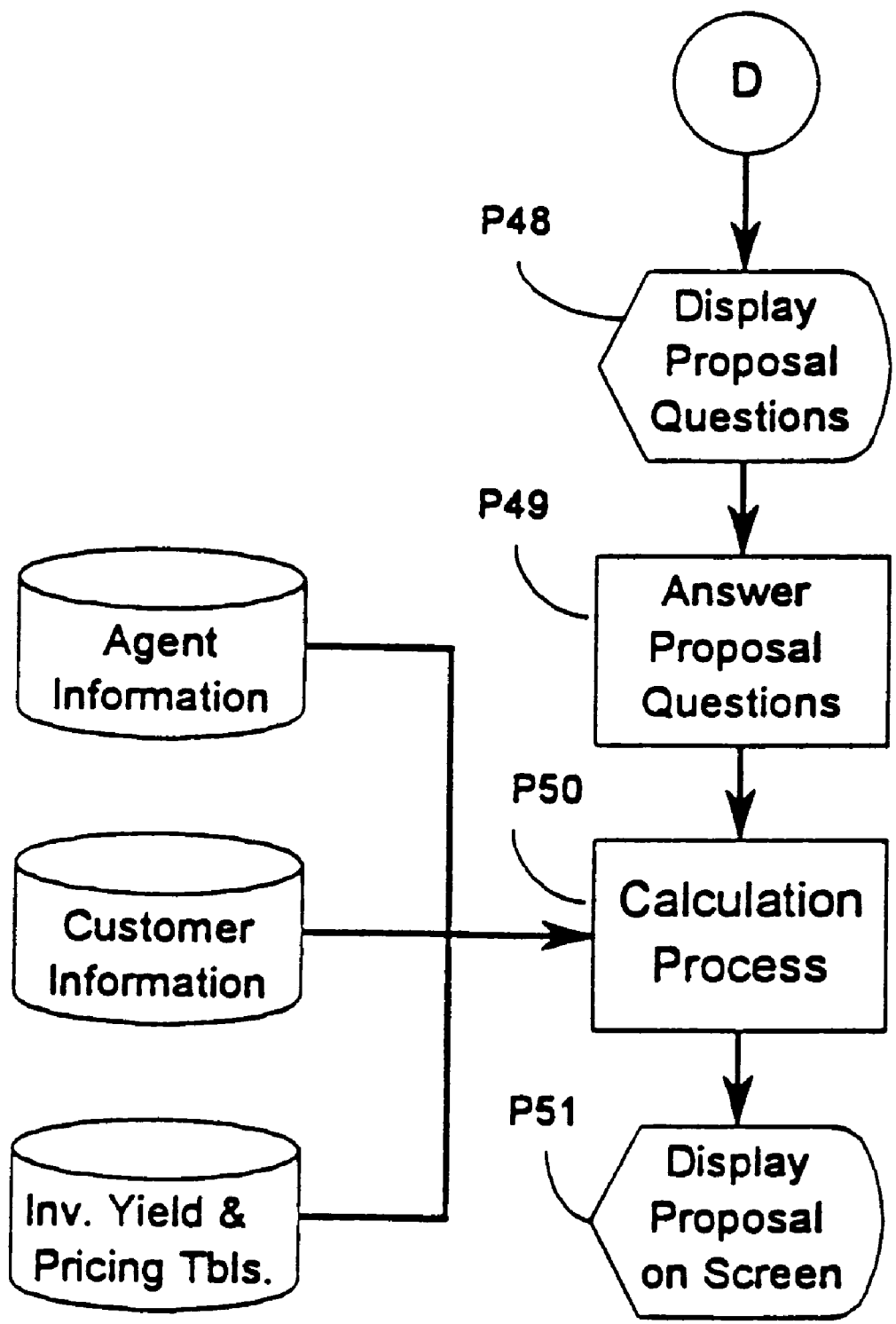
FIG. 6 is a flowchart of the basic proposal display, calculation and presentation procedure of the annuity system of the present invention.

FIG. 6 is a flowchart of the basic proposal display, calculation and presentation procedure of the annuity system of the present invention. As shown in FIG. 6, processor 6 performs steps P48 and P49 for generating annuity proposals and involves the display of a series of questions on display 12 to be answered by the customer, with assistance from an agent. Using the customer generated answers and previously stored agent, customer, investment yield and pricing parameters, processor 6 generates an annuity or product proposal that is displayed on display 12. The customer can print the proposal on printer 14 or modify the answers input in step P49 to generate different annuity proposals.

One example of the specific questions as well as process flow which may be asked and performed in step P48 may be the following questions:

1. Do you want Lifetime Income (L), or Income for a Fixed Number of years (F) ?__
2. <If (F) entered>
   Fixed Number of Years (5 to 30):__
   <Go to Mode Payment Question>
3. <If (L) entered>
   Benefits to be Paid During the Lifetime of Single (S), or Joint (J) Life:__
4. <If (S) entered, go to Years Certain Question>
5. <If (J) entered>
   Does Benefit amount reduce upon death of Either Person (E), First Person Only (1), or No Reduction (N):__
6. <If (E) or (1) entered>
   Percentage of Benefit Remaining After Reduction (25.00% to 75.00%):__
7. <If Either (J) or (S) entered>
   You can specify a certain number of years that Payments will be made even if all covered persons are deceased. The range is 0 to 30 Years:__
8. In some special cases laws require Unisex (U) rates, versus sex distinct (X) rates:__
9. <All proposals use following questions>
   Number of Benefit Payments per year: (1) annual, (2) semiannual, (4) quarterly, or (12) monthly:__
10. Fixed (FX) or Compound (CP) Percentage Annual Increase in Benefit Amount:__
11. Annual Increase in Benefit Amount (0.00% to 10.00%):__
12. Date Coverage to Start (mm/dd/yyyy):__
13. First Benefit mailed on start date [for Settlement Options] (N), or made after one mode period [for S.P.I.A and CD sales] (A):__
14. Amount of Consideration: $__

Once the customer has entered the above information, the agent then discusses the various annuity programs available for selection by the customer. For the present invention, the annuity options A–E and special features are discussed below:

A. Fixed Period Installments

Under option A, the annuitant will be paid all or part of the proceeds of the contract in equal monthly, quarterly, semiannual or annual installments for a fixed period as determined by the annuitant. If the annuitant dies before the end of the fixed period, payments will continue to the annuitant's Named Beneficiary for the remainder of the period.

B. Life Annuity

Under Option B, the annuitant will be paid all or part of the proceeds of the contract in equal monthly, quarterly, semiannual or annual installments as long as the Annuitant is alive. At the time of the annuitant's death, payments for this annuity will stop.

C. Joint and Survivor Annuity

Under Option C, the annuitant will be paid all or part of the proceeds of the contract in equal monthly, quarterly, semiannual or annual installments as long as both the annuitant and a named joint annuitant are alive. At the death of either the annuitant or the joint annuitant, payments of xx % (typically anywhere between 25% to 100%) of the installment amount will continue to be paid to the survivor as long as the survivor is alive. At the time of the survivor's death, payments will stop and no further payments will be made.

D. Joint and Contingent Annuity

Under Option D, the annuitant will be paid all or part of the proceeds of the contract in equal monthly, quarterly, semi-annual or annual installments as long as the annuitant is alive. At the death of the annuitant, payments of xx % (typically between 25% to 75%) of the installment amount will continue to be paid to the named contingent annuitant as long as the contingent annuitant is alive. If the contingent annuitant does not survive the annuitant at the time of the annuitant's death, payments will stop and no further payments will be paid.

E. Proceeds at Interest and Flexible CD

Under Option E, all or part of the proceeds of the contract will be held and interest will be paid thereon in monthly, quarterly, semiannual or annual installments for a fixed period typically anywhere between 5 to 30 years. At the end of the fixed period selected, the annuitant/CD owner will be paid the remaining value in one lump sum or will be permitted to apply the remaining value to any other investment option then offered. If the annuitant/CD owner dies before the end of the period elected, payments will continue to the annuitant/CD owner's named beneficiary for the remainder of the period. The annuitant/CD owner's named beneficiary will also receive the lump sum payment at the end of the period.

F. Period Certain Feature (Options B,C,D)

Under Feature F, any fixed period may be selected (typically not greater than 30 years) during which benefits are guaranteed to be paid to the annuitant even if all annuitants have died. If the Annuitant (and joint or contingent annuitant, if applicable) die before the end of the guaranteed period, payments will continue to the annuitant's named beneficiary for the remainder of the period.

G. Annual Increase in Benefits Feature (Options A,B,C,D)

Under Feature G, the customer may select the installment payments to include an increase (or decrease) each year in an amount ranging from 0% to 10%. Each year after the installment payments start, this fixed or compounded amount will be added to the benefit payments. Note that the fixed amount of the increase is typically based on the original installment amount, and the compounded amount is, for example, a percentage increase from the prior year's installment payments. If a percentage reduction is activated under Options C or D for the survivor or contingent annuitant, this reduction also applies to the annual increase amounts.

Having described the basic Options (A–E) and Features (F–G), next is a discussion of process for generating proposal Options A–E and Feature F–G. FIGS. 7–11 are flowcharts of the calculation procedure for options A–D of the annuity system of the present invention which is performed in step P50 of FIG. 6.

Figure 7:
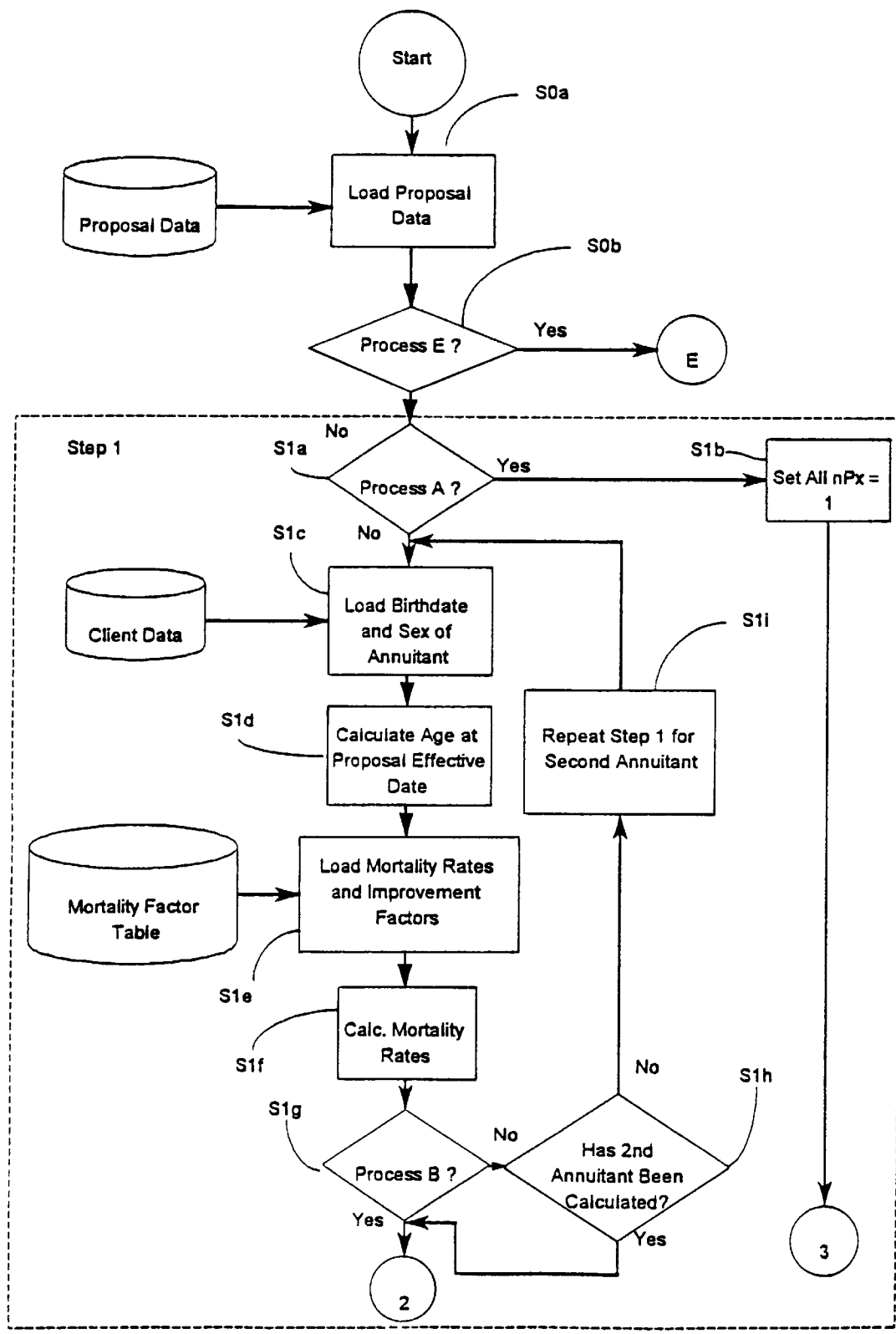
FIGS. 7–11 are flowcharts of the calculation procedure for options A–D of the annuity system of the present invention.

As shown in FIG. 7, the proposal data which was collected in steps P48 and P49 of FIG. 6, is loaded into memory, such as a Random Access Memory (RAM) by Processor 6 in step S0*a*. Next processor 6 determines whether Options A–d or Option E are being requested in step S0*b*. If Option E is selected, a different process is performed as described below with respect to FIGS. 14–15. Assuming that Option E is not requested, processor 6 then determines whether Option A is selected in Step S1*a*. When processor 6 determines that process A is selected in step S0*a*, processor 6 sets all probabilities for surviving to the start of each year of the proposal contract, nPx, to 1 in step S1*b* and then continues with step 3 shown in FIG. 8. By setting all nPx to 1, all payments for the payment period are guaranteed as required under the fixed period installments Option A.

However, if Option A is not selected in step S1a, processor 6 loads into memory the birth date and sex of annuitant from read/write/delete memory 8 in step S1c, and calculates the age at the proposal effective date in step S1d to ensure that the quoted proposal rates are accurate in step S1d. Next, processor 6 loads into memory the predetermined mortality rates and improvement factors stored in memory 8 in step S1e and calculates mortality rates considering the applicable improvement factors in step S1f.

Consider the following example which is used throughout this discussion of FIGS. 7–11. Assume a single life annuity is selected by a customer for Option B with the special feature of a twelve year certain period, and the special feature of an annual increase of benefits of a 4% fixed amount for a single male, age 65.

In general, the probability of dying in a year for a person age x at the start of the year is Qx. Of 1,000 males age 65 at the start of the year, on the average 14.248 will die during the year based on the assumed mortality rate from the mortality table. The process for determining mortality rates also considers that individual mortality rates improve with time as shown in step S1e. For the above example, it is assumed that the following mortality rates table is applicable for the 65 year old male.

| Age | 1.000 Qx | Factor | 1,000 Qxd |
| --- | --- | --- | --- |
| 65 | 14.248 | 1.50 | 12.066 |
| 66 | 15.761 | 1.50 | 13.147 |
| 67 | 17.467 | 1.50 | 14.351 |
| 68 | 19.373 | 1.45 | 15.790 |
| 69 | 21.486 | 1.40 | 17.390 |
| and continuing the table . . . | | | |
| 110 | 663.417 | 1.00 | 377.883 |
| 111 | 720.626 | 1.00 | 406.365 |
| 112 | 782.640 | 1.00 | 436.921 |
| 113 | 849.708 | 1.00 | 469.620 |
| 114 | 922.077 | 1.00 | 504.521 |
| 115 | 1,000.000 | 0.00 | 1,000.000 |

Thus, it is assumed that the improvement factor for a 65 year old male is 1.50% per year. The system projects this improvement for 10 years plus the duration from when the option is selected (1 year at age 65, 2 years at age 66, etc. The 10 year factor is added because the data for the mortality table is 10 years old in 1993. The first year of the calculation will be in 1994, so duration 1 is projected another year. The last duration for this example of a 65 year old is the 51st duration, when the person is 115 years old and the assumed probability of dying is 100%. The first probability of dying which considers the improvement factor is the improvement factor 1.50% which is for the investment period. Thus, improvement factor 1.50% at age 65 must be applied to the initial mortality rate to determine the projected mortality rate including the improvement factor. Accordingly, the probability Qx which is reduced by the improvement factor is determined as follows:

Mortality Improv. Factor=1000Qx=

$(1-(\text{improv. factor}/100))^{(10+duration)}$ $(1-1.50/100)^{11}=0.846834486$, and 1000Qx(65)=

14.248 $(1000Qx)*0.846834486$ (Mortality Improv. Factor)=12.066; and $1000Qx(66)=15.761*(1-1.5/100)^{(10+duration\ 2)}=15.761*0.834131968=13.147$.

Once the projected mortality rates are determined by processor 6, processor 6 then determines whether Option B was selected in step S1g. When process B is not selected, then the only remaining Options are C and D, and therefore, processor 6 performs steps S1h and S1i to determine the projected mortality rates for the second annuitant.

Figure 8:
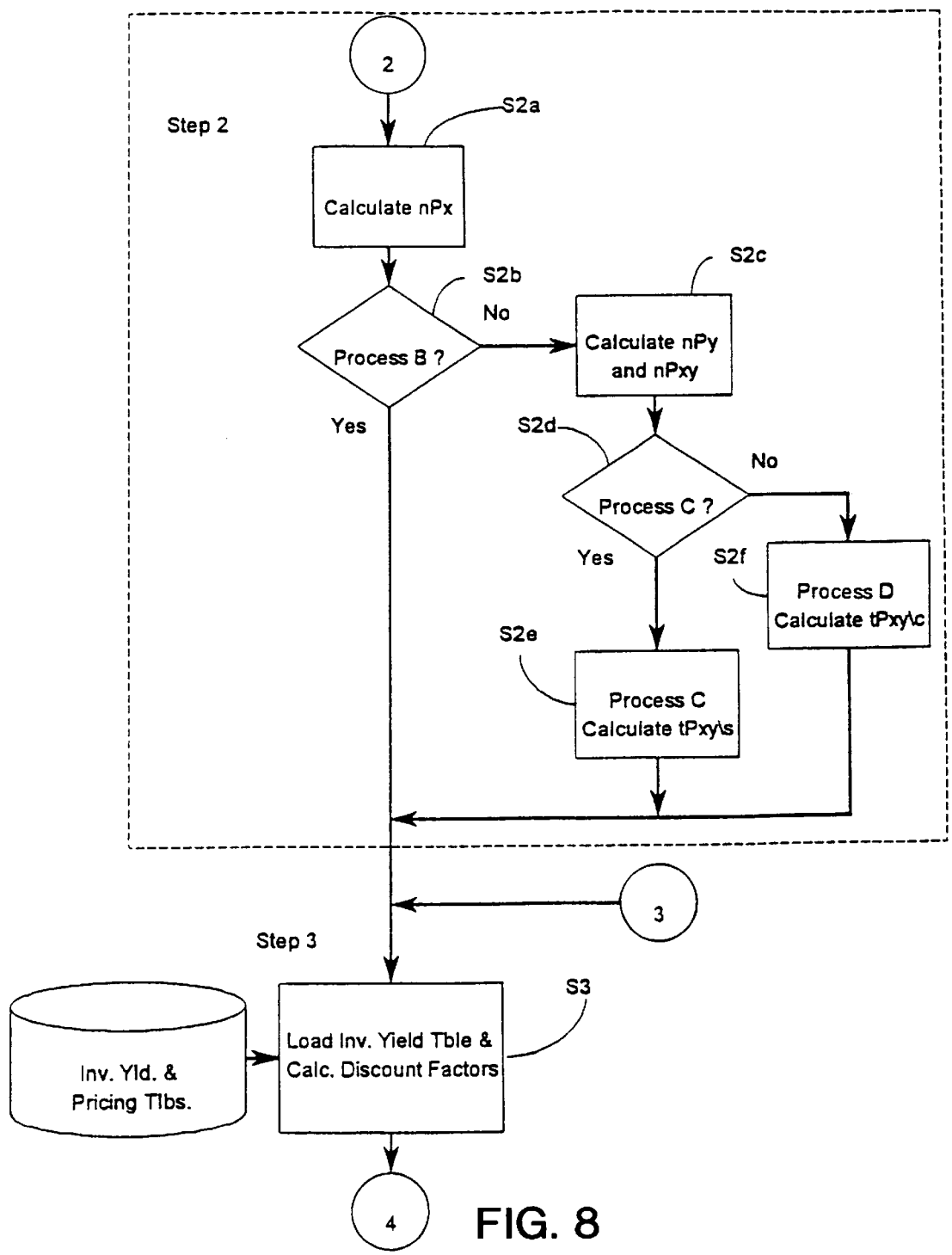

When processor 6 determines that Option B is selected in step S1g, or when processor 6 determines that no second annuitant is needed in step S1h, processor 6 next determines the probability of surviving to the start of each year for either single or joint annuities in step S2 which includes steps S2a–S2e in FIG. 8. At time 0, the combined probability of surviving to the start of the year, including the factor for reduced benefits if a joint life option is elected is called nPx, and is always 1.0 at time 0. For a single life, the probability of surviving the first year is 1Px, and is equal to (1−Qx). Surviving through the second year is 2Px, which equals 1Px*(1−Qx+1). This calculation repeats for 3Px, etc. In this example for a 65 year old male the calculation is:

1Px=(1−1000Qx*0.001)=(1−12.066*0.001)=0.987934, and

2Px=1Px*(1−1000Qx*0.001)=0.987934*(1−13.147*0.001)= 0.974946.

Since the example has just one life for Option B, the nPx for the second person is always 0.0. A sample table displaying the generated nPx for a single life is displayed below.

| Dur | First Person nPx | Second Person nPx | Joint nPx | Combined Survivor nPx |
| --- | --- | --- | --- | --- |
| 0 | 1.000000 | 1.000000 | 1.000000 | 1.000000 |
| 1 | 0.987934 | 0.000000 | 0.000000 | 0.987934 |
| 2 | 0.974946 | 0.000000 | 0.000000 | 0.974946 |
| 3 | 0.960955 | 0.000000 | 0.000000 | 0.960955 |
| 4 | 0.945782 | 0.000000 | 0.000000 | 0.945782 |
| 5 | 0.929335 | 0.000000 | 0.000000 | 0.929335 |
| 6 | 0.941533 | 0.000000 | 0.000000 | 0.911533 |
| and continuing the table . . . | | | | |
| 45 | 0.003664 | 0.000000 | 0.000000 | 0.003664 |
| 46 | 0.002279 | 0.000000 | 0.000000 | 0.002279 |
| 47 | 0.001353 | 0.000000 | 0.000000 | 0.00135348 |
| 48 | 0.000762 | 0.000000 | 0.000000 | 0.00076249 |
| 49 | 0.000404 | 0.000000 | 0.000000 | 0.000404 |
| 50 | 0.000200 | 0.000000 | 0.000000 | 0.00020051 |
| 51 | 0.000000 | 0.000000 | 0.000000 | 0.000000 |

Processor 6 then again determines whether Option B is selected in step S2b. When processor 6 determines that Option B is not selected, then the only remaining Options available are Options C and D which require the determination of the probability of surviving for the second person. Accordingly, step S2c determines the probability of surviving for the second person. Thus, the calculation of 1,000Qx is repeated for both annuitants and nPx in step S2a is expanded to include two lives, versus the single life. A sample set of values for the second person is presented below:

| | Second Person | | |
| --- | --- | --- | --- |
| Age | 1.000 Qx | Factor | 1,000 Qx |
| 65 | 8.241 | 1.75 | 6.786 |
| 66 | 9.114 | 1.75 | 7.374 |
| 67 | 10.012 | 1.75 | 7.959 |
| 68 | 10.931 | 1.75 | 8.537 |
| 69 | 11.916 | 1.75 | 9.144 |

-continued

| | Second Person | | |
|---|---|---|---|
| Age | 1.000 Qx | Factor | 1,000 Qx |
| 70 | 13.027 | 1.75 | 9.821 |
| and continuing the table . . . | | | |
| 77 | 28.433 | 1.50 | 20.084 |
| 78 | 32.017 | 1.50 | 22.277 |
| 79 | 36.029 | 1.50 | 24.692 |
| 80 | 40.525 | 1.50 | 27.357 |

Next, processor 6 determines whether the user selected Option C in step S2d. When processor 6 determines that Option C is selected, processor 6 determines the combined probability of surviving to the start of the year, including a percentage of benefit amount that is paid to the surviving annuitant, $Pxy^s$, according to Option C. In order to determine the combined probability including the percentage benefit, the user has previously input the percentage of benefit Z % during steps P48 and P49 in FIG. 6. Accordingly, Z % is the percentage of benefit that is paid to the surviving annuitant. If Z %=100% this is a full survivor annuity; Z % typically varies from 25% to 100%. Accordingly, the combined probability for making a payment in year n is defined as follows:

nPxys=Z %*nPx+Z %*nPy−(2*Z %−1)*nPxy

=Z %*nPx+Z %*nPy−(2*Z %−1)*nPx*nPy, where nPxy=nPx*nPy

Note that nPxys will be used in place of nPx to determine 1Qx+t−1 in Step S7b. In the sample calculation below, both annuitants are age 65 at issue, with the joint annuitant being female, and the Z % factor is 40%.

| Term | First Person nPx | Second Person nPx | Joint nPx | Combined Survivor nPx |
|---|---|---|---|---|
| | 1.000000 | 1.000000 | 1.000000 | 1.000000 |
| 1 | 0.987934 | 0.993214 | 0.981230 | 0.988705 |
| 2 | 0.974946 | 0.985890 | 0.961189 | 0.976572 |
| 3 | 0.960955 | 0.978043 | 0.939855 | 0.963570 |
| 4 | 0.945782 | 0.969693 | 0.917118 | 0.949614 |
| 5 | 0.929335 | 0.960826 | 0.892929 | 0.934650 |
| and continuing the table . . . | | | | |
| 12 | 0.775333 | 0.875042 | 0.678450 | 0.795840 |
| 13 | 0.747889 | 0.857468 | 0.641292 | 0.770401 |
| 14 | 0.719103 | 0.838366 | 0.602872 | 0.743562 |
| 15 | 0.689004 | 0.817665 | 0.563375 | 0.715343 |
| 16 | 0.657640 | 0.795296 | 0.523019 | 0.685778 |

When processor 6 determines that Option C is not selected, processor 6 determines the combined probability of surviving to the start of the year, including a percentage of benefit amount that is paid to the surviving contingent annuitant, $Pxy^c$, according to Option D. In order to determine the combined probability including the percentage benefit, the user has previously input the percentage of benefit Z % during steps P48 and P49 in FIG. 6. Accordingly, Z % is the percentage of benefit that is paid to the surviving contingent annuitant. Z % typically varies from 25% to 75%. Accordingly, the combined probability for making a payment in year n is defined as follows:

nPxyc=nPx+Z %*nQx*nPy

=nPx+Z %*(1−nPx)*nPy

Note that nPxyc is used in place of nPx to determine 1Qx+t−1 in Step S7b. In the example below, both annuitants are age 65 at issue, with the contingent joint annuitant being female, and the Z % factor is 40%.

| Term | First Person nPx | Second Person nPx | Joint nPx | Combined Survivor nPx |
|---|---|---|---|---|
| | 1.000000 | 1.000000 | 1.000000 | 1.000000 |
| 1 | 0.987934 | 0.993214 | 0.981230 | 0.992728 |
| 2 | 0.974946 | 0.985890 | 0.961189 | 0.984826 |
| 3 | 0.960955 | 0.978043 | 0.939855 | 0.976230 |
| 4 | 0.945782 | 0.969693 | 0.917118 | 0.966812 |
| 5 | 0.929335 | 0.960826 | 0.892929 | 0.956494 |
| and continuing the table . . . | | | | |
| 12 | 0.775333 | 0.875042 | 0.678450 | 0.853970 |
| 13 | 0.747889 | 0.857468 | 0.641292 | 0.834360 |
| 14 | 0.719103 | 0.838366 | 0.602872 | 0.813301 |
| 15 | 0.689004 | 0.817665 | 0.563375 | 0.790720 |
| 16 | 0.657640 | 0.795296 | 0.523019 | 0.766551 |

Once processor 6 determines the appropriate probabilities in either steps S2a, S2e or S2f, processor 6 then determines the interest rate discount factors to be used in the process in step S3. The interest rates ($i_t$) are equal to the initial estimated gross investment yield that was an input item, where (t) is the duration or year. The discount factor for year t is ($v_t$), where: $v_t=1/(1+i_t)$. An example of a table of interest rates and discount factors is presented below:

| Duration in Block of Years | $i_t$ | $v_t$ |
|---|---|---|
| 1 & 2 | 3.97% | 96.181591% |
| 3 & 4 | 4.72% | 95.492743% |
| 5 & 6 | 5.45% | 94.831674% |
| 7 to 10 | 6.28% | 94.091080% |
| 11 to 20 | 6.76% | 93.668040% |
| 21 to 30 | 7.06% | 93.405567% |
| 31 and over | 7.35% | 93.153237% |

Calculations made in each block of years is discounted back to time zero using a discount rate based on the interest rate for the block of years. This process assumes that investments made at time zero to cover benefit and expense costs in future blocks of years can be structured so that the reinvestment of funds prior to that year will be at the same estimated gross investment yield as the particular block of years. For example, interest on investments made at issue (time zero) for benefit and expense payments that will be made in years 5 and 6 is assumed to be reinvested at the same rate (5.45%=$i_5$). The annuity system of the present invention handles this process by discounting transactions in years 5 and 6 to the beginning of year 5 at the 5.45% discount rate, and then discounting that amount to time zero using the multi-year discount factors from the following table that is generated by the system via processor 6. The general formula for this discount process is:

Discount from Start of Block of Years Period to $0=1/(1+i_t)^{(\text{first year in block of investment years}-1)}$ Accordingly, for the block of years 5 & 6, the Discount to time zero=$0.8087488268=1/(1+0.0545)^4$. A listing of discount factors to time zero for all investment block years is described below:

| Years | Current Rate | Discount From Start of Period To Time 0 |
|---|---|---|
| 1 & 2 | 3.97% | 1.0000000000 |
| 3 & 4 | 4.72% | 0.9118863880 |
| 5 & 6 | 5.45% | 0.8087488268 |
| 7 to 10 | 6.28% | 0.6938901548 |
| 11 to 20 | 6.76% | 0.5198934535 |
| 21 to 30 | 7.06% | 0.2555378397 |
| 31 + | 7.35% | 0.1191073430 |

Accordingly, step S3 provides the benefit of utilizing more than one interest rate for determining annuity proposals which has not been done before.

Figure 9:
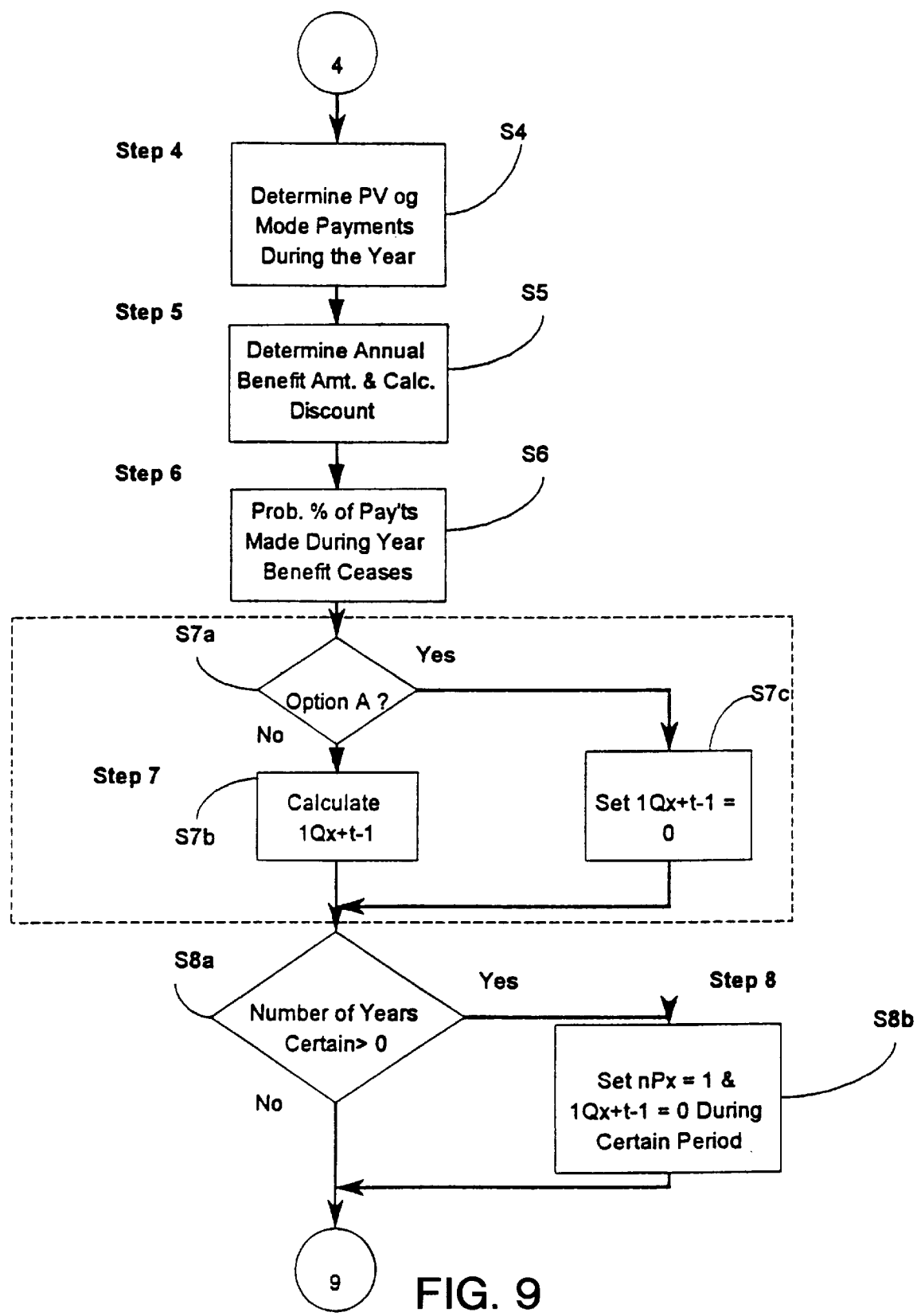
Figure 10:
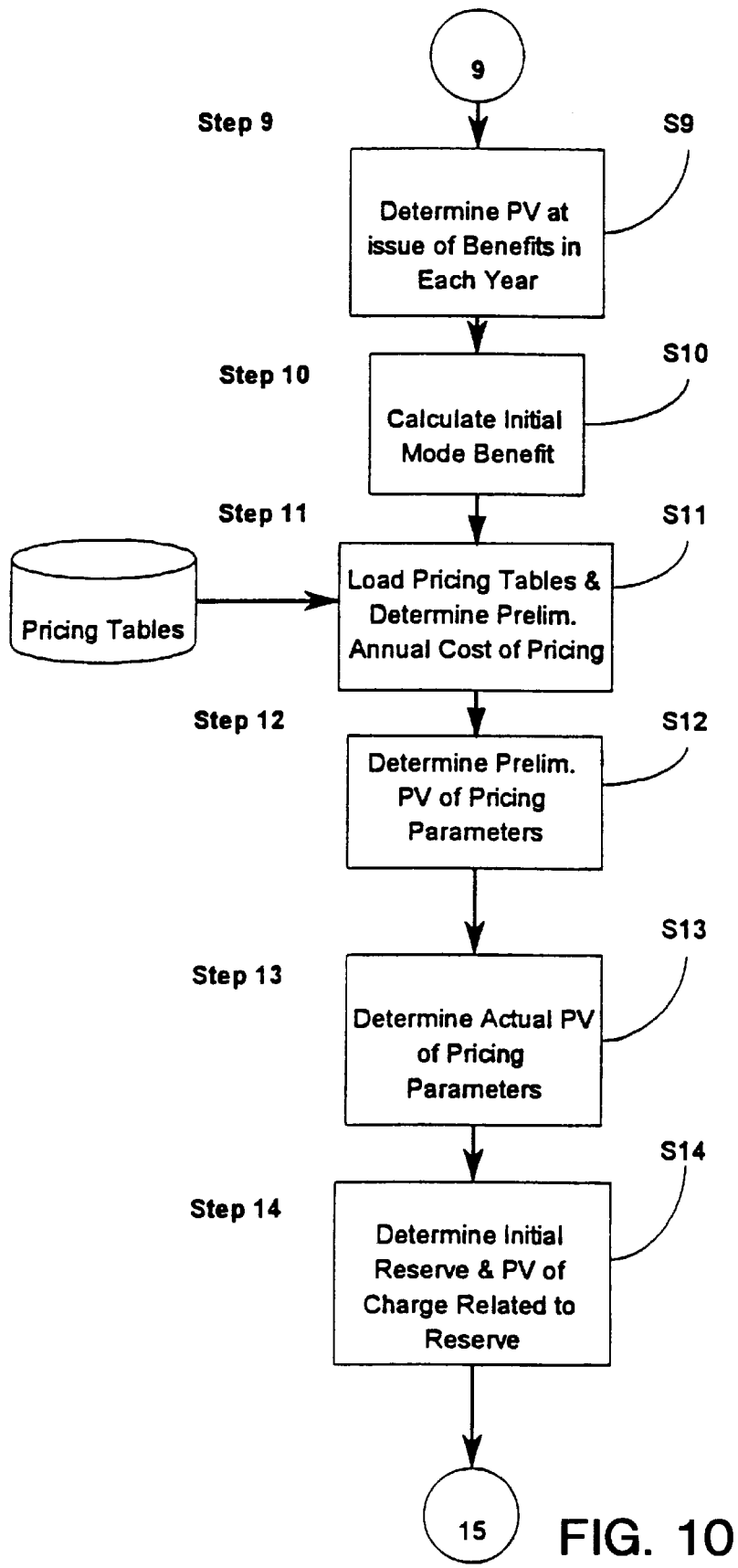
Figure 11:
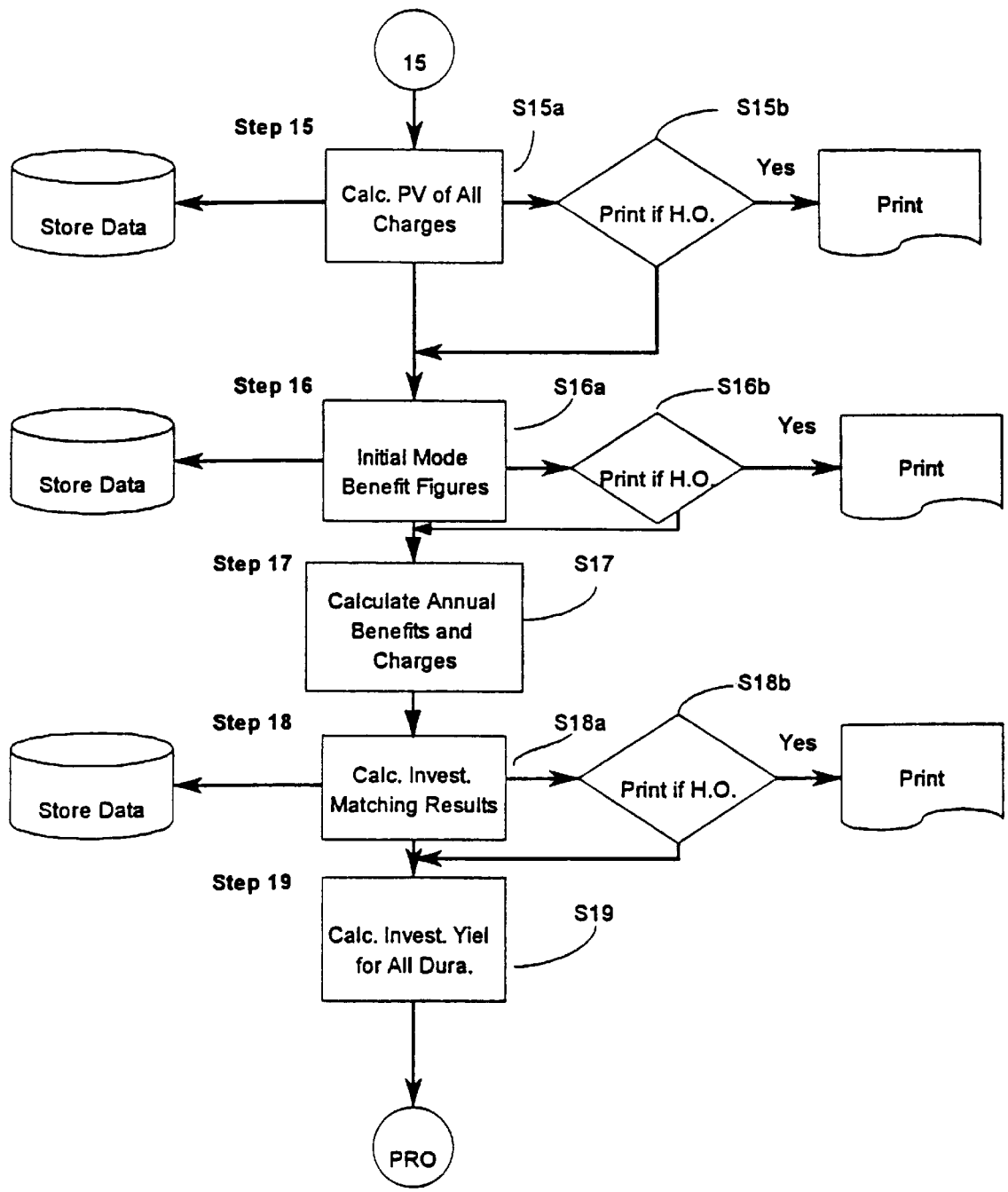

Processor 6 next determines the present value at the start of the year of a payment of 1 made at the time of each mode payment in step S4 which is shown in FIG. 9. For each block of years and payment mode selected, a unique modal interest rate (iy(m)/m) and modal discount rate (VMy) is calculated. The general formulas are:

iy(m)/m=$(1+i_{(block\ of\ years)})^{1/m}-1$

VMy=1/(1+iy(m)/m)

For block of years 5 & 6, where m=12 (for monthly benefits):

iy(m)/m=$(1+0.0545)^{(1/12)}-1$=0.443202%, and

VMy=1/(1+0.00443202)=99.558754%.

For settlement options the first payment made at the start of each year has a discount of 1.0, and the payment made at the start of the second period has a discount of VMy. The general formula for monthly discounts is:

VMy (mode count)=VMy $(2)^{(mode\ count-1)}$

For a monthly payment example for block of years 5 and 6, the discount for the payment made at the start of the 3rd month, VMy(3)=VMy$(2)^2$=99.558754$^2$=99.119455. This is repeated for all mode payments VMy(4)–VMy(12) in the year. The sum of 12 mode settlement option (SO) payments for block of years 5 and 6 is 1171.301876=(Sum VMy). For single premium immediate annuities (SPIAs) the first payment is made at the end of the first mode period and the last payment is made at the end of the year, so the settlement option for (Sum VMy) is adjusted to remove the first payment at the start of the year and add one payment at the end of the year. The relationship between SPIA and SO is as follows:

Sum VMy for SPIA=Sum VMy for S.O.−1+$V_t$, where $V_t$ is the discount factor for the selected block of years. In the current example of monthly payments for block of years 5 and 6:

1166.133553%=1171.301876%−1+94.831677%.

A listing of the modal discount rates for SO and SPIA for the above example is displayed below:

| Mode Count | Sum VMy 1 to 2 | Sum VMy 3 to 4 | Sum VMy 5 to 6 | Sum VMy 7 to 10 |
|---|---|---|---|---|
| 1 | 100.000000% | 100.000000% | 100.000000% | 100.000000% |
| 2 | 99.676091% | 99.616405% | 99.558754% | 99.493728% |
| 3 | 99.353231% | 99.234281% | 99.119455% | 98.990019% |
| 4 | 99.031417% | 98.853624% | 98.682094% | 98.488860% |
| 5 | 98.710645% | 98.474426% | 98.246664% | 97.990239% |
| 6 | 98.390913% | 98.096683% | 97.813154% | 97.494142% |
| 7 | 98.072216% | 97.720389% | 97.381557% | 97.000556% |
| 8 | 97.754551% | 97.345539% | 96.951865% | 96.509470% |
| 9 | 97.437915% | 96.972126% | 96.524069% | 96.020869% |
| 10 | 97.122305% | 96.6001 46% | 96.098160% | 95.534742% |
| 11 | 96.807717% | 96.229593% | 95.674131% | 95.051077% |
| 12 | 96.494148% | 95.860461% | 95.251973% | 94.569860% |
| (k − 1) | 1178.851149% | 1175.003673% | 1171.301876% | 1167.143562% |
|  | 96.181595% | 95.492745% | 94.831677% | 94.091079% |
| (k) | 1175.032744% | 1170.496418% | 1166.133553% | 1161.234641% |

| Mode Count | Sum VMy 11 to 20 | Sum VMy 21 to 30 | Sum VMy 31 + |
|---|---|---|---|
| 1 | 100.000000% | 100.000000% | 100.000000% |
| 2 | 99.456373% | 99.433119% | 99.410707% |
| 3 | 98.915701% | 98.869452% | 98.824887% |
| 4 | 98.377969% | 98.308979% | 9B.242519% |
| 5 | 97.843160% | 97.751684% | 97.663582% |
| 6 | 97.311258% | 97.197549% | 97.0B8058% |
| 7 | 96.782248% | 96.646554% | 96.515924% |
| 8 | 96.256113% | 96.098683% | 95.947163% |
| 9 | 95.732839% | 95.553918% | 95.381753% |
| 10 | 95.212409% | 95.012241% | 94.819675% |
| 11 | 94.694809% | 94.473635% | 94.260909% |
| 12 | 94.180022% | 93.938082% | 93.705436% |
| (k − 1) | 1164.762901% | 1163.283896% | 1161.860613% |
|  | 93.668034% | 93.405565% | 93.153237% |
| (k) | 1158.430935% | 1156.689461% | 1155.013850% |

Processor 6 then determines the assumed mode benefit amount for each year and calculates the annual discount rate in step S5. The process uses an initial assumed modal benefit amount, for example, $100. At the start of each year the customer can select a fixed or compound increase. The annual discount rate $V_t$ for each year is calculated using the $v_t$ for the discount within each block of years multiplied by the discount to time zero factors from Step S3. Thus, the annual discount rate for year 6 is:

$V_6$=94.831674%*0.8087488268=76.695005%

In this example, a fixed 4% increase is included and displayed below as the assumed mode benefit for each year (in column "Plus 100" below).

| Yr | iy(m)/m | VMy | PIN100 (Y − 1) | Plus 100.00 | Vt | Sum VMy |
|---|---|---|---|---|---|---|
| 1 | .324962% | 99.676091% | 0.00 | 100.00 | 100.000000% | 1178.851149% |
| 2 | .324962% | 99.676091% | 4.00 | 104.00 | 96.181591% | 1178.851149% |
| 3 | .385072% | 99.616405% | 8.00 | 108.00 | 91.188639% | 1175.003673% |
| 4 | .385072% | 99.616405% | 12.00 | 112.00 | 87.078532% | 1175.003673% |
| 5 | .443202% | 99.558754% | 16.00 | 116.00 | 80.874883% | 1171.301876% |
| 6 | .443202% | 99.558754% | 20.00 | 120.00 | 76.695005% | 1171.301876% |
| 7 | .508848% | 99.493728% | 24.00 | 124.00 | 69.389015% | 1167.143562% |
| 8 | .508848% | 99.493728% | 28.00 | 128.00 | 65.288874% | 1167.143562% |
| 9 | .508848% | 99.493728% | 32.00 | 132.00 | 61.431007% | 1167.143562% |
| 10 | .508848% | 99.493728% | 36.00 | 136.00 | 57.801098% | 1167.143562% |
| and the table continues . . . | | | | | | |
| 25 | .570113% | 99.433119% | 96.00 | 196.00 | 19.451194% | 1163.283896% |
| 26 | .570113% | 99.433119% | 100.00 | 200.00 | 18.168498% | 1163.283896% |
| 27 | 0.570113% | 99.433119% | 104.00 | 204.00 | 16.970389% | 1163.283896% |
| 28 | 0.570113% | 99.433119% | 108.00 | 208.00 | 15.851288% | 1163.283896% |
| 29 | 0.570113% | 99.433119% | 112.00 | 212.00 | 14.805985% | 1163.283896% |
| 30 | 0.570113% | 99.433119% | 116.00 | 216.00 | 13.829614% | 1163.283896% |
| 31 | 0.592786% | 99.410707% | 120.00 | 220.00 | 11.910734% | 1161.860613% |

Processor 6 next determines the probable amount of percentage of the payments made during the year the benefits cease in step S6. If the benefits cease during a year due to death of the annuitant, the average number of settlement option payments made will be typically about 50% if payments where made continuously during the year. Since payments are made on a curtate modal basis, an appropriate mode payment factor is subtracted from the probability of benefits ceasing from 100% and is adjusted by first multiplying this probability by a mode payment factor according to the process described below:

For S.P.I.A., the mode payment factor=(M+1)/2M

For S.O., the mode payment factor=(M−1)/2M

For the 12 payment settlement option (SO) example, the payment mode factor=0.45833333=(12−1)/24.

Once the payment mode factor is determined in step S6, processor 6 determines the probability that benefits will cease during the year due to death of an annuitant (i.e., 1Qx+t−1) in step S7. As discussed below, the probability that payments will be made at the start of the year is nPx, as calculated in step S2. Processor 6 first determines whether Option A has been selected in S7a. When processor 6 determines that Option A has been selected, processor 6 sets all the probability that payments will ceases to 0 since Option A is a guaranteed return, and therefore, payments will never cease. When processor 6 determines that Option A is not selected, processor 6 then determines (1Qx+t−1). The probability that payments cease during the year due to death is: (1Qx+t−1)=1−(nPx/n−1Px).

As mentioned above, for Options C and D, nPx is either nPxys for the joint and survivor annuitants under Option C, and nPxyc joint and contingent annuitants, under Option D. In this example of a 65 year old male, the year 5 probability is:

1Qx+5−1=1−(5Px/4Px)=1−(0.929335/0.945782)=0.017390.

Processor 6 next sets the probabilities as discussed below when a year is designated as within the certain period selected according to Feature F. If a customer has selected a certain payment period, the number of years certain will be greater than 0 in step S8a. Next, processor 6 sets the nPx values during that certain period is set at 1.0 in step S8b, indicating 100% probability of payments during the certain period. In addition, the values for (1Qx+t−1) which is the probability for ceasing payments in any given year t are set to 0 during the certain period, indicating the there is 0% probability that payments will cease during the certain period. In this example the customer has selected a 12 year certain period. Therefore, nPx is set to 1 and (1Qx+t−1) is set to 0 for the twelve year period.

Next, processor 6 determines the present value at time zero of the assumed benefit payments made in each future year, FinalSumt. FinalSum$_t$ is determined according to the following:

FinalSum$_t$=Plus100t*Vt*Sum VMt*tPx*(1−1Qx+t−1)*(M−1)/2M.

Note that for SPIAs instead of SOs, the figure (M−1)/2M is replaced with (M+1)/2M. In the following example, Final-Sum$_t$ for the 5th and 15th years is as follows:

FinalSum$_5$ = 116.00*80.874883%*1171.301876%*1.000000*(1.0−0.00000)*0.45833333=1,098.855261

FinalSum$_{15}$ = 156.00*40.020276%*1164.762901%*0.719103*(1.0−0.041856)*0.45833333=512.886007

A partial listing of the values for FinalSum$_t$ between years 1 and 51 is displayed below:

| YEAR | Probab of Start Year | Probab of Stop in Year | Final Sum | YEAR | 1Qx + t − 10 |
|---|---|---|---|---|---|
| 1 | 1.000000 | 0.000000 | 1,178.851149 | 1 | 0.012066 |
| 2 | 1.000000 | 0.000000 | 1,179.191302 | 2 | 0.013147 |
| 3 | 1.000000 | 0.000000 | 1,157.187444 | 3 | 0.014351 |
| 4 | 1.000000 | 0.000000 | 1,145.957070 | 4 | 0.015790 |
| 5 | 1.000000 | 0.000000 | 1,098.855261 | 5 | 0.017390 |
| 6 | 1.000000 | 0.000000 | 1,077.996040 | 6 | 0.019156 |
| 7 | 1.000000 | 0.000000 | 1,004.238089 | 7 | 0.021097 |
| 8 | 1.000000 | 0.000000 | 975.379060 | 8 | 0.023220 |
| 9 | 1.000000 | 0.000000 | 946.424213 | 9 | 0.025294 |
| 10 | 1.000000 | 0.000000 | 917.485635 | 10 | 0.027526 |

-continued

| YEAR | Probab of Start Year | Probab of Stop in Year | Final Sum | YEAR | 1Qx + t − 10 |
|---|---|---|---|---|---|
| and the table continues . . . | | | | | |
| 40 | 0.030329 | 0.246299 | 5.034439 | 40 | 0.246299 |
| 41 | 0.022859 | 0.263966 | 3.557126 | 41 | 0.263966 |
| 42 | 0.016825 | 0.283210 | 2.451579 | 42 | 0.283210 |
| 43 | 0.012060 | 0.304146 | 1.643430 | 43 | 0.304146 |
| 44 | 0.008392 | 0.326859 | 1.068110 | 44 | 0.326859 |
| 45 | 0.005649 | 0.351390 | 0.670623 | 45 | 0.351390 |
| 46 | 0.003664 | 0.378002 | 0.405088 | 46 | 0.378002 |
| 47 | 0.002279 | 0.406319 | 0.234328 | 47 | 0.406319 |
| 48 | 0.001353 | 0.436807 | 0.129160 | 48 | 0.436807 |
| 49 | 0.000762 | 0.469816 | 0.067403 | 49 | 0.469816 |
| 50 | 0.000404 | 0.504950 | 0.033053 | 50 | 0.504950 |
| 51 | 0.000200 | 1.000000 | 0.010888 | 51 | 1.000000 |

After performing step S9, processor 6 determines the assumed initial mode benefit payment excluding expenses in step S10. Specifically, processor 6 determines an initial benefit payment amount assuming no deductions for various expense parameters, except premium taxes. Processor 6 performs the following operations:

Benefit Factor per $1,000 of initial net consideration= BENFAC=1,000/(PV100Ben*0.01), where
PV100Ben=summation of $FinalSum_t$ from t=1 to 115−x+1, and x is the age of the annuitant. In this example, PV100Ben=17,799.522564,
The benefit factor per $1,000=BENFAC=1,000/ PV100Ben*0.01, and
Initial Benefit payment excluding expense charges= PREBEN=Consider.*(1−Premium Tax)*BENFAC*0.001.
Thus, for the above example,
PV100Ben=17,799.52256
Initial Mode Payment=$561.81
BENFAC=5.618128

After step S10 is performed, processor 6 then determines the preliminary annual cost of the pricing parameters in step S11. Processor 6 first determines the annual value of benefits (ANNBEN) as of the start of each year t, based on the benefit factor (BENFAC) determined in step S10 as follows:

ANNBENt=BENFAC*$FinalSum_t/V_t$.

Processor 6 next determines the preliminary reserve at the beginning of each year (PRE'Vt):

PRE'Vt=BENFAC*summation of $FinalSum_n/V_n$, where n=t to 115−x+1

Processor 6 next determines the agent commission (COMMt) using the issue commission (ISSUE COMM) and renewal commission (R'NWL COMM):

For t=1,

COMM1=CONSIDERATION*ISSUE COMM*(1−PREM. TAX).

For t>1,

COMMt=PRE'Vt*R'NWL COMM %.

The maintenance expense (MEXPt) is next determined by processor 6 using expenses due to issue of proposal (ISSUE EXP) and annual maintenance expenses (ANN EXP):

For t=1, MEXP1=ISSUE EXP+ANN EXP

For t>1, MEXPt=tPx*ANN EXP*$(1+INFL\ \%)^{(t-1)}$

Processor 6 next determines the investment and risk charge expense (INVRSKt) as follows: INVRSKt= PRE'Vt*INVESTMENT & RISK CHARGE %, where INVESTMENT & RISK CHARGE % is pre-determined by the company offering the annuity program.

Processor 6 determines the profit and surplus charge expense (PROFSURPt) as follows:

PROFSURPt=PRE'Vt*PROFIT & SURPLUS CHARGE %, where PROFIT & SURPLUS CHARGE % is predetermined by the company offering the annuity program.

Finally, processor 6 determines the total value of annual benefit payments and charges (PRE'COSTt) according to:

PRE'COSTt=ANNBENt+COMMt+MEXPt+INVRSKt+ PROFSURPt.

A sample table for the 65 year old male is presented below:

| YEAR | Value of Annual Benefit at Start of Year | Beginning of Year Statutory Reserve | Issue and Renewal Comm. | Issue and Maint. Expense | Invest. and Risk Charge | Profit and Surplus Charge | Total Value of Benefits & Risk Chgs Start of Year |
|---|---|---|---|---|---|---|---|
| 1 | 6,622.936906 | 100,000.00 | 3,500.00 | 140.00 | 400.00 | 1,000.00 | 8,022.94 |
| 2 | 6,887.854381 | 97,084.13 | 242.71 | 41.60 | 388.34 | 970.84 | 8,489.74 |
| 3 | 7,129.426998 | 95,134.89 | 237.84 | 43.26 | 380.54 | 951.35 | 8,699.16 |
| 4 | 7,393.479849 | 92,159.32 | 230.40 | 44.99 | 368.64 | 921.59 | 8,914.11 |
| 5 | 7,633.407982 | 91,267.96 | 228.17 | 46.79 | 365.07 | 912.68 | 9,139.33 |
| 6 | 7,896.628946 | 88,192.63 | 220.48 | 48.67 | 352.77 | 881.93 | 9,351.81 |
| 7 | 8,130.881102 | 88,750.39 | 221.88 | 50.61 | 355.00 | 887.50 | 9,595.26 |
| 8 | 8,393.167594 | 85,682.42 | 214.21 | 52.64 | 342.73 | 856.82 | 9,806.93 |
| 9 | 8,655.454080 | 82,143.02 | 205.36 | 54.74 | 328.57 | 821.43 | 10,010.81 |
| 10 | 8,917.740566 | 78,102.58 | 195.26 | 56.93 | 312.41 | 781.03 | 10,206.44 |
| 11 | 9,161.302252 | 76,918.83 | 192.30 | 59.21 | 307.68 | 769.19 | 10,430.47 |
| 12 | 9,423.053745 | 72,337.94 | 180.84 | 61.58 | 289.35 | 723.38 | 10,616.62 |
| 13 | 7,387.130172 | 67,167.93 | 167.92 | 49.65 | 268.67 | 671.68 | 8,495.40 |
| 14 | 7,307.688511 | 63,821.98 | 159.55 | 49.81 | 255.29 | 638.22 | 8,360.75 |
| 15 | 7,199.998688 | 60,334.66 | 150.84 | 49.81 | 241.34 | 603.35 | 8,195.53 |
| 16 | 7,063.403452 | 56,726.57 | 141.82 | 49.63 | 226.91 | 567.27 | 7,999.40 |
| 17 | 6,897.537768 | 53,020.39 | 132.55 | 49.27 | 212.08 | 530.20 | 7,772.37 |
| 18 | 6,702.388821 | 49,240.76 | 123.10 | 48.70 | 196.96 | 492.41 | 7,514.86 |
| 19 | 6,478.416198 | 45,413.97 | 113.53 | 47.93 | 181.66 | 454.14 | 7,227.75 |
| 20 | 6,226.862430 | 41,567.59 | 103.92 | 46.93 | 166.27 | 415.68 | 6,912.73 |

-continued

| YEAR | Value of Annual Benefit at Start of Year | Beginning of Year Statutory Reserve | Issue and Renewal Comm. | Issue and Maint. Expense | Invest. and Risk Charge | Profit and Surplus Charge | Total Value of Benefits & Risk Chgs Start of Year |
|---|---|---|---|---|---|---|---|
| 21 | 5,942.454710 | 39,907.78 | 99.77 | 45.71 | 159.63 | 399.08 | 6,600.93 |
| 22 | 5,643.914734 | 36,363.27 | 90.91 | 44.28 | 145.45 | 363.63 | 6,243.90 |
| 23 | 5,327.341859 | 32,888.15 | 82.22 | 42.65 | 131.55 | 328.88 | 5,869.99 |
| 24 | 4,993.757663 | 29,506.60 | 73.77 | 40.84 | 118.03 | 295.07 | 5,480.63 |
| 25 | 4,643.550043 | 26,243.45 | 65.61 | 38.83 | 104.97 | 262.43 | 5,076.56 |
| 26 | 4,281.204882 | 23,124.85 | 57.81 | 36.62 | 92.50 | 231.25 | 4,662.76 |
| 27 | 3,911.190602 | 20,174.01 | 50.44 | 34.24 | 80.70 | 201.74 | 4,244.07 |
| 28 | 3,537.985416 | 17,410.97 | 43.53 | 31.73 | 69.64 | 174.11 | 3,825.27 |
| 29 | 3,169.913993 | 14,852.42 | 37.13 | 29.11 | 59.41 | 148.52 | 3,414.97 |
| 30 | 2,815.480995 | 12,507.29 | 31.27 | 26.49 | 50.03 | 125.07 | 3,021.85 |
| Table Continuing . . . | | | | | | | |
| 42 | 252.302494 | 690.93 | 1.73 | 3.36 | 2.76 | 6.91 | 263.70 |
| 43 | 181.563652 | 470.87 | 1.18 | 2.50 | 1.88 | 4.71 | 189.33 |
| 44 | 126.676405 | 310.57 | 0.78 | 1.81 | 1.24 | 3.11 | 131.81 |
| 45 | 85.380804 | 197.41 | 0.49 | 1.27 | 0.79 | 1.97 | 88.63 |
| 46 | 55.364735 | 120.26 | 0.30 | 0.86 | 0.48 | 1.20 | 57.34 |
| 47 | 34.380333 | 69.67 | 0.17 | 0.55 | 0.28 | 0.70 | 35.53 |
| 48 | 20.343046 | 37.88 | 0.09 | 0.34 | 0.15 | 0.38 | 20.96 |
| 49 | 11.396440 | 18.83 | 0.05 | 0.20 | 0.08 | 0.19 | 11.72 |
| 50 | 5.999332 | 7.98 | 0.02 | 0.11 | 0.03 | 0.08 | 6.13 |
| 51 | 2.121496 | 2.12 | 0.01 | 0.06 | 0.01 | 0.02 | 2.16 |

After determining the preliminary annual cost of pricing parameters in step S11, processor 6 determines the preliminary present values of pricing parameters in step S12. Processor 6 first determines the present value of renewal commissions (PVRNWLCOM):

PVRNWLCOM=(1000/PRE'V1)*summation of (COMMt*$V_t$),
where t=2 to 115−x+1.

Processor 6 then determines the investment and risk charge (PVINVRSK) according to:

PVINVRSK=(1000/PRE'V1)*summation of (INVRSKt*$V_t$),
where t=1 to 115−x+1.

Next, the profit and surplus charge (PVPROFSURP) per $1,000 initial reserve is determined according to:

PVPROFSURP=(1000/PRE'V1)*summation (PROFSURPt*$V_t$),
where t=1 to 115−x+1.

Finally, processor 6 determines the present value of issue and maintenance expenses (PVMEXP):

PVMEXP=summation of (MEXPt*$V_t$*tPx),
where t=1 to 115−x+1.

The various information determined above may be displayed by the Home Office on display 22 for review. However, as indicated previously, this type of pricing information is usually considered confidential, and therefore, agents will typically be unable to display this information on display 12. The various pricing parameters are displayed below for the example of the 65 year old male.

| Pricing Parameters | |
|---|---|
| $100,000.00 = | Consideration |
| $3,500.00 = | Issue Commission |
| $0.00 = | Premium Tax |
| $22.79 = | Present Value of Renewal Commission Per $1,000 of Initial Reserve |
| $659.73 = | Present Value of Maintenance Cost |

-continued

| Pricing Parameters | |
|---|---|
| $40.46 = | Present Value of Investment and Risk Charge Per $1,000 of Initial Reserve |
| $101.15 = | Present Value of Profit and Surplus Charge Per $1,000 of Initial Reserve |

Processor 6 next determines the actual present values of pricing parameters in step S13. Specifically, processor 6 determines the present value of the modal benefit payments (PV100BEN), e.g. $100:

PV100BEN=summation of FinalSum$_t$, where
t=1 to 115−x+1

Processor 6 also determines the net consideration (NETCONSID) and present value of charges per $100 of initial reserve (PVCHRG):

NETCONSID=CONSID.−ISSUE COMM−PREM. TAX−PVMEXP;
PVCHRG=PVCOMM+PVINVRSK+PVPROFSURP.

Processor 6 then may display the actual present values of the pricing parameters on display 22 for the Home Office upon request. A sample display of the present values of the pricing parameters for the 65 year old male example is presented below:

| Present Value of Pricing Parameters | |
|---|---|
| 17,799.5225640 = | Present Value of $100 Initial Mode Benefit Payment |
| $95,840.27 = | Net Consideration after Tax, Issue Commission and Maintenance Expenses |
| $164.39 = | P.V. of Renewal Commission, Invest. Exp., and Profit per $1.000 Initial Reserve |

After completing step S13, processor 6 determines the actual initial reserve and present value of charges or expenses related to the reserve. The actual initial reserve at the start of the first year (ACT'V1) is: ACT'V1= NETCONSID/(1−PVCHRG*0.001).

Processor 6 also determines the actual present values of renewal commissions (ACTPVCOMM), investment and risk charge (ACTPVINVRSK), and profit and surplus charge (ACTPVPROFSURP):

ACTPVCOMM=PVCOMM*(NETCONSID−ACT'V1)/PVCHRG.

ACTPVINVRSK=PVINVRSK*(NETCONSID−ACT'V1)/PVCHRG.

ACTPVPROFSURP=PVPROFSURP*(NETCONSID−ACT'V1)/PVCHRG.

In addition, processor 6 determines the initial modal benefit payment (ACTBEN):

ACTBEN=ACTV1/(PV100BEN*0.001)

The initial reserve and present value of expenses may be displayed on display 22 for the Home Office. An example of the display is presented below for the 65 year old male.

| Initial Reserve and Present Value of Charges to Reserve |
| --- |
| $82,309.28 = Initial Reserve |
| $1,875.56 = Present Value of Renewal Commissions |
| $3,330.12 = Present Value of Investment Expense & Risk Charge |
| $8,325.30 = Present Value of Surplus and Profit Charge |

After completing step S14, processor 6 groups together the remaining present values for other charges/costs relating to the issuing of the annuity proposal, such as premium tax and maintenance cost, which have been previously determined in step S15a. Processor 6 also displays this information on display 22 or prints the information on printer 24 in step 15b as the total allocation of consideration for financial use by the company providing the annuity proposal. Thus, the consideration less all actual charges (as calculated above) results in the actual initial reserve. An example of the format of the above information is shown below.

| Consideration Allocation |
| --- |
| $100,000.00 = Consideration |
| $3,500.00 = Issue Commission |
| $659.73 = Present Value of Maintenance Cost |
| $0.00 = Premium Tax |
| $1,875.56 = Present Value of Renewal Commissions |
| $3,330.12 = Present Value of Invest. Exp. & Risk Charge |
| $8,325.30 = Present Value of Surplus and Profit Charge |
| $17,690.71 = Subtotal of Charges |
| $82,309.28 = Initial Reserve |

Processor 6 next groups together the initial modal benefit amount, benefit increase amount, total certain payments and yield on certain payments in step S16a. Processor 6 may also display the initial modal benefit amount, benefit increase amount, total certain payments and yield on certain payments (if positive) for use by the Home Office in validating insurance policy values on display 22 or print the benefits on printer 24 in step 16b. An example of the information to be displayed is presented below:

| Initial Mode Benefit | Annual Mode Increase |
| --- | --- |
| $462.42 | $18.50 |
| Total Certain Payments | Total Certain Yield |
| $81,240 | 0.00% |

Next, processor 6 determines the actual annual charges, benefit payments and probability of payment in step S17. Processor 6 first determines the actual reserve (ACT'V) for all years as follows:

ACT'Vt=PRE'Vt*ACT'V1/PRE'V1.

The previously calculated annual maintenance expense, MEXPt is displayed and the actual annual renewal commission, investment and risk charge and surplus and profit charge are all calculated off of the actual reserve figures. The expected actual benefit payments for each year (ACTANNBENt) is:

ACTANNBENt=ANNBENt*ACTBEN/PREBEN.

The total expected benefit and expenses to be paid in each year, valued as of the start of each year is then displayed (TOTBENt), along with the probability of full benefits being paid in the year tPx. A sample of the information which is displayed on display 22 is shown below:

| YR | Start of Yr Res. | Maint. Expense | Renwl Comm. | Exp. Benefit Payments | Invest. Exp. & Risk Chg. | Surplus & Profit | Total Payments | Probability of Payment |
| --- | --- | --- | --- | --- | --- | --- | --- | --- |
| 1 | 82,309 | 140.00 | 0 | 5,451.24 | 329 | 823 | 6,744 | 1.0000000 |
| 2 | 79,909 | 41.60 | 200 | 5,669.29 | 320 | 799 | 7,029 | 1.0000000 |
| 3 | 78,305 | 43.26 | 196 | 5,868.13 | 313 | 783 | 7,203 | 1.0000000 |
| 4 | 75,856 | 44.99 | 190 | 6,085.47 | 303 | 759 | 7,382 | 1.0000000 |
| 5 | 75,122 | 46.79 | 188 | 6,282.95 | 300 | 751 | 7,569 | 1.0000000 |
| 6 | 72,591 | 48.67 | 181 | 6,499.60 | 290 | 726 | 7,746 | 1.0000000 |
| 7 | 73,050 | 50.61 | 183 | 6,692.41 | 292 | 730 | 7,948 | 1.0000000 |
| 8 | 70,525 | 52.64 | 176 | 6,908.29 | 282 | 705 | 8,125 | 1.0000000 |
| 9 | 67,611 | 54.74 | 169 | 7,124.18 | 270 | 676 | 8,295 | 1.0000000 |
| 10 | 64,286 | 56.93 | 161 | 7,340.06 | 257 | 643 | 8,458 | 1.0000000 |
| 11 | 63,311 | 59.21 | 158 | 7,540.54 | 253 | 633 | 8,644 | 1.0000000 |
| 12 | 59,541 | 61.58 | 149 | 7,755.98 | 238 | 595 | 8,800 | 1.0000000 |

-continued

| YR | Start of Yr Res. | Maint. Expense | Renwl Comm. | Exp. Benefit Payments | Invest. Exp. & Risk Chg. | Surplus & Profit | Total Payments | Probability of Payment |
|---|---|---|---|---|---|---|---|---|
| 13 | 55,285 | 38.50 | 138 | 6,080.24 | 221 | 553 | 7,031 | 0.7753330 |
| 14 | 52,531 | 37.25 | 131 | 6,014.85 | 210 | 525 | 6,919 | 0.7478890 |
| 15 | 49,661 | 35.82 | 124 | 5,926.21 | 199 | 497 | 6,781 | 0.7191030 |
| 16 | 46,691 | 34.20 | 117 | 5,813.79 | 187 | 467 | 6,618 | 0.6890040 |
| 17 | 43,641 | 32.40 | 109 | 5,677.26 | 175 | 436 | 6,430 | 0.6576400 |
| 18 | 40,530 | 30.44 | 101 | 5,516.64 | 162 | 405 | 6,216 | 0.6250850 |
| 19 | 37,380 | 28.35 | 93 | 5,332.29 | 150 | 374 | 5,977 | 0.5914410 |
| 20 | 34,214 | 26.13 | 86 | 5,125.24 | 137 | 342 | 5,716 | 0.5568510 |
| 21 | 32,848 | 23.84 | 82 | 4,891.15 | 131 | 328 | 5,457 | 0.5215340 |
| 22 | 29,930 | 21.51 | 75 | 4,645.42 | 120 | 299 | 5,161 | 0.4857760 |
| 23 | 27,070 | 19.19 | 68 | 4,384.86 | 108 | 271 | 4,851 | 0.4499100 |
| 24 | 24,287 | 16.92 | 61 | 4,110.29 | 97 | 243 | 4,528 | 0.4142940 |
| 25 | 21,601 | 14.70 | 54 | 3,822.04 | 86 | 216 | 4,193 | 0.3786750 |
| 26 | 19,034 | 12.58 | 48 | 3,523.80 | 76 | 190 | 3,850 | 0.3434000 |
| 27 | 16,605 | 10.57 | 42 | 3,219.24 | 66 | 166 | 3,504 | 0.3087870 |
| 28 | 14,331 | 8.73 | 36 | 2,912.06 | 57 | 143 | 3,157 | 0.2751290 |
| 29 | 12,225 | 7.06 | 31 | 2,609.11 | 49 | 122 | 2,818 | 0.2426980 |
| 30 | 10,295 | 5.63 | 26 | 2,317.38 | 41 | 103 | 2,493 | 0.2123500 |
| 31 | 9,262 | 4.40 | 23 | 2,036.83 | 37 | 93 | 2,194 | 0.1841920 |
| 32 | 7,757 | 3.38 | 19 | 1,774.89 | 31 | 78 | 1,906 | 0.1582950 |
| 33 | 6,421 | 2.55 | 16 | 1,530.51 | 26 | 64 | 1,639 | 0.1346990 |
| 34 | 5,250 | 1.88 | 13 | 1,305.00 | 21 | 53 | 1,394 | 0.1134120 |
| 35 | 4,235 | 1.35 | 11 | 1,099.22 | 17 | 42 | 1,170 | 0.0943970 |
| 36 | 3,367 | 0.95 | 8 | 913.61 | 13 | 34 | 970 | 0.0775880 |
| 37 | 2,633 | 0.65 | 7 | 748.24 | 11 | 26 | 792 | 0.0628930 |
| 38 | 2,024 | 0.43 | 5 | 602.91 | 8 | 20 | 637 | 0.0502030 |
| 39 | 1,525 | 0.28 | 4 | 477.11 | 6 | 15 | 503 | 0.0393940 |
| 40 | 1,125 | 0.17 | 3 | 370.06 | 5 | 11 | 389 | 0.0303290 |
| 41 | 810 | 0.10 | 2 | 280.68 | 3 | 8 | 294 | 0.0228590 |
| 42 | 569 | 0.06 | 1 | 207.67 | 2 | 6 | 217 | 0.0168250 |
| 43 | 388 | 0.03 | 1 | 149.44 | 2 | 4 | 156 | 0.0120600 |
| 44 | 256 | 0.02 | 1 | 104.27 | 1 | 3 | 109 | 0.0083920 |
| 45 | 162 | 0.01 | 0 | 70.28 | 1 | 2 | 73 | 0.0056490 |
| 46 | 99 | 0.00 | 0 | 45.57 | 0 | 1 | 47 | 0.0036640 |
| 47 | 57 | 0.00 | 0 | 28.30 | 0 | 1 | 29 | 0.0022790 |
| 48 | 31 | 0.00 | 0 | 16.74 | 0 | 0 | 17 | 0.0013530 |
| 49 | 15 | 0.00 | 0 | 9.38 | 0 | 0 | 10 | 0.0007620 |
| 50 | 7 | 0.00 | 0 | 4.94 | 0 | 0 | 5 | 0.0004040 |

After completion of step S17, processor 6 then determines the investment matching results which indicates to the Home Office the required investments to be made to cover the annuity proposal in step S18a. For each block of years, the estimated gross investment yield is displayed and the exact amount of investment matching for the specified security duration (INVMATCHs-e) is determined according to:

INVMATCHs-e=summation of TOTBENt*$V_t$, where t=s to e, and s is the starting period of the investment block and e is the ending period of the investment block.

The information generated in step S18a is used by the insurance company finance department to purchase the correct amount and duration of securities to match the expected benefit and expense cash flows form the annuity product and may be printed on printer 24 in step S18b. An example of the investment matching table for the 65 year old male is presented below:

| | Investment Matching | | |
|---|---|---|---|
| Years | Est. Yield | MT | Purchase |
| 1 & 2 | 3.97% | 1 | 13,505 |
| 3 & 4 | 4.72% | 3 | 12,997 |
| 5 to 6 | 5.45% | 5 | 12,062 |
| 7 to 10 | 6.28% | 7 | 20,804 |
| 11 to 20 | 6.76% | 10 | 27,930 |

-continued

| | Investment Matching | | |
|---|---|---|---|
| Years | Est. Yield | MT | Purchase |
| 21 to 30 | 7.06% | 20 | 8,023 |
| 31 to 50 | 7.35% | 30 | 1,178 |
| Total | | | 96,499 |
| Extra past 50 Yrs: 1 | | | |

Processor 6 then determines the investment yield for each year that the total benefit payment exceeds the consideration using a conventional successive bi-section iterative process in step S19. The values are displayed on the proposal for the agent and customer to review according to the proposal generating routine discussed below. A sample of the final product proposal is shown in FIGS. 12–13. As shown in FIG. 13, the present invention provides the added benefit of determining and displaying the investment yield as the benefit years increase.

Figure 14:
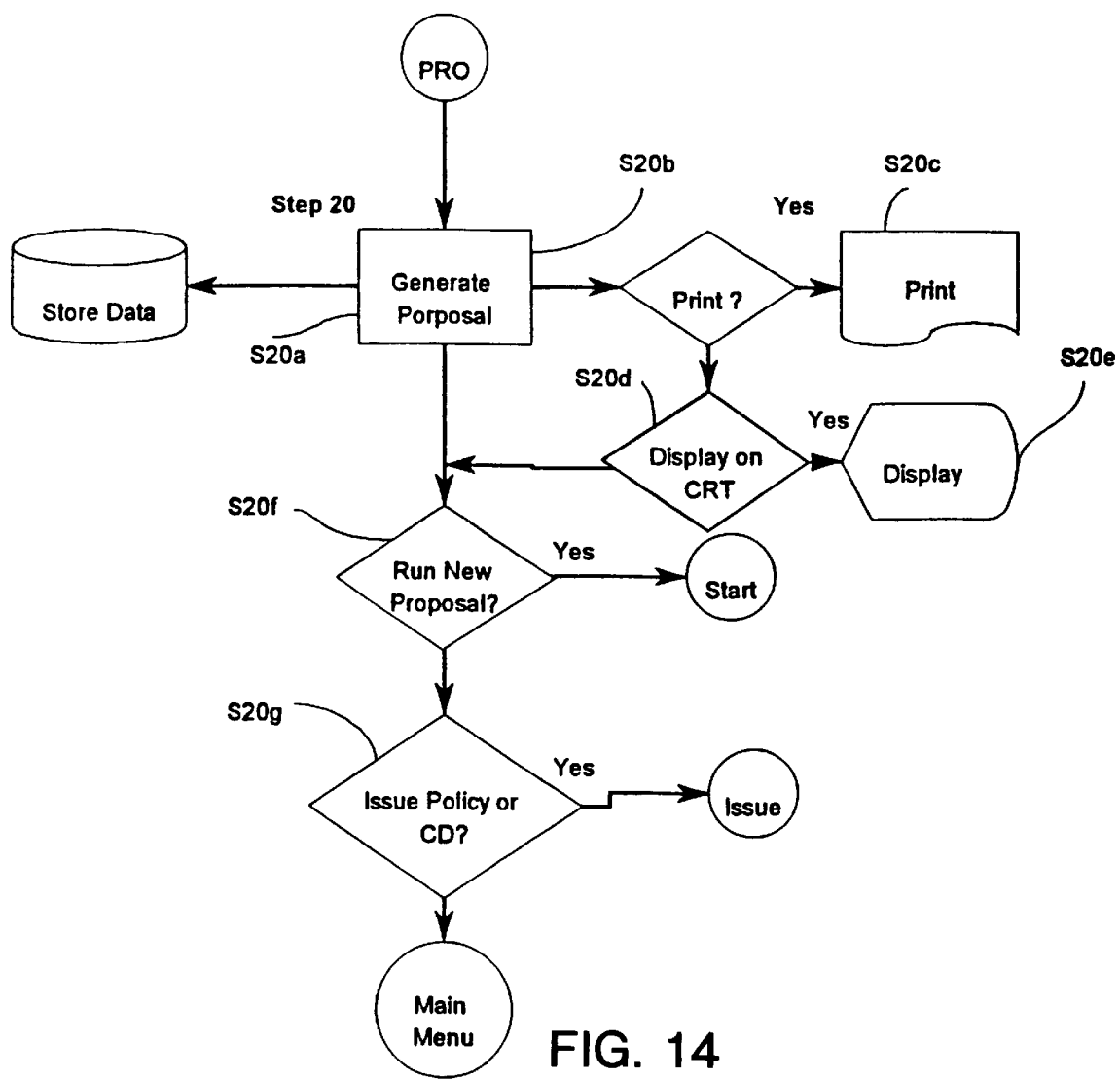
FIG. 14 is a flowchart of the detailed procedure of the proposal presentation procedure of the annuity system of the present invention.

FIG. 14 is a flowchart of the detailed procedure of the proposal presentation procedure of the annuity system of the present invention. In FIG. 14, after processor 6 performs step S19 in FIG. 11, processor 6 generates the product proposal in step S20a in, for example, the format shown in FIGS. 12 and 13. The product proposal may then be printed on printer 14 in steps 20b and 20c, or the product proposal may be displayed on display 12 in steps S20d and S20e for viewing by both the customer and the agent. In addition, the customer is asked whether a new proposal should be generated in step S20f presumably when the generated product proposal is not acceptable, and whether the product proposal should be issued in step S20g.

Figure 15:
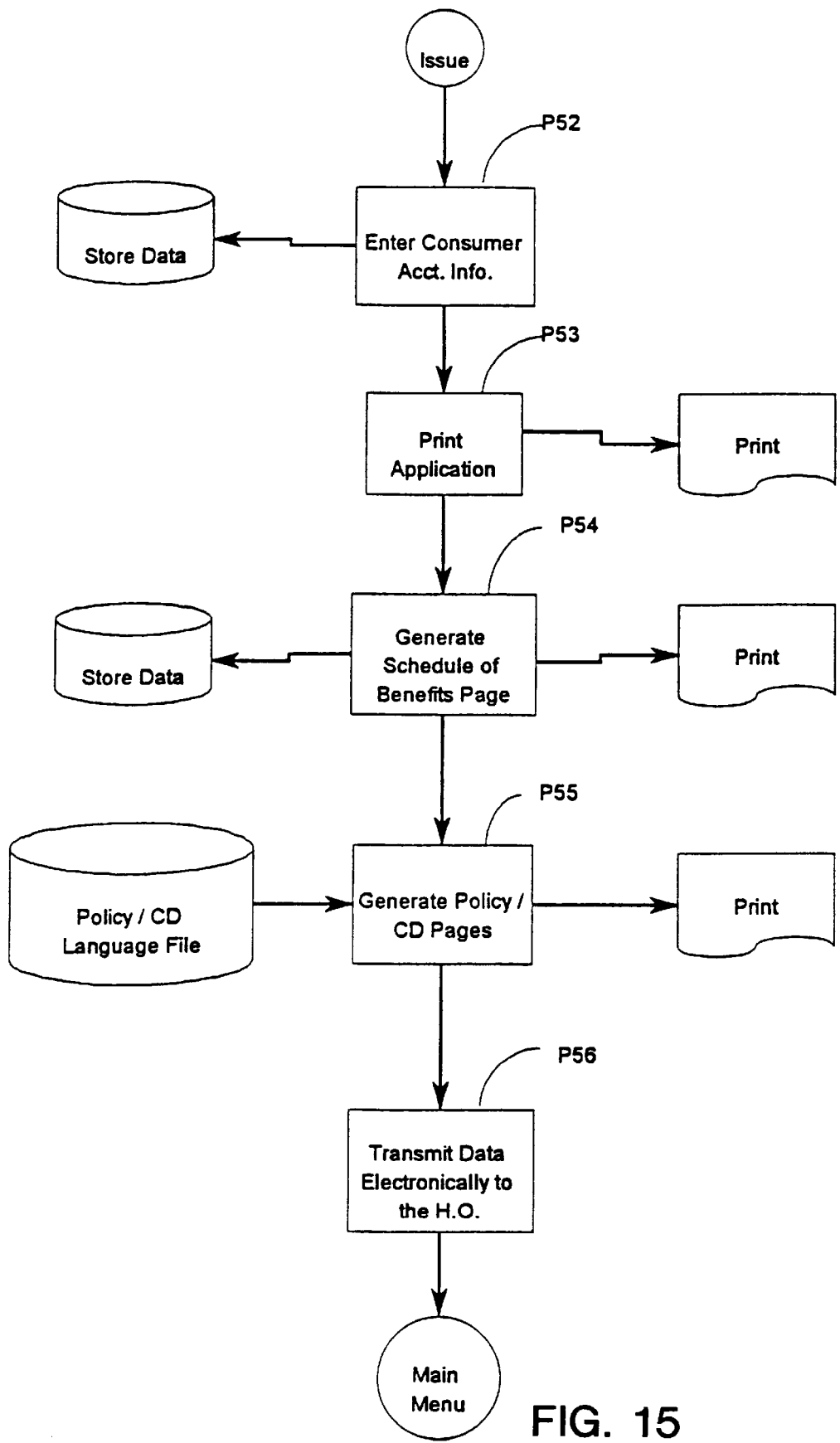
FIG. 15 is a flowchart of the issue procedure of the present invention.

If the customer indicates that the product proposal should be issued, then the issue procedure shown in FIG. 15 is implemented. Processor 6 first prompts the customer to enter account information via display 12, and the customer enters the account information via input device 10 in step P52. Next, the application for the product proposal which is the written confirmation that the customer has requested issuance of the product proposal is generated in step P53 and printed on printer 14 for signature by the customer. Finally, processor 6 generates the schedule of benefits and the product policy forms in steps P54 and P55 which are printed on printer 14. In addition, the annuity policy may be electronically transmitted to home office system 4 so that home office system 4 will be notified of the new annuity policy details including the investment matching information. Home office system 4 will then be able to obtain the necessary investments to finance the annuity policy as well as alter the reserves to support the additional investments.

Figure 16:
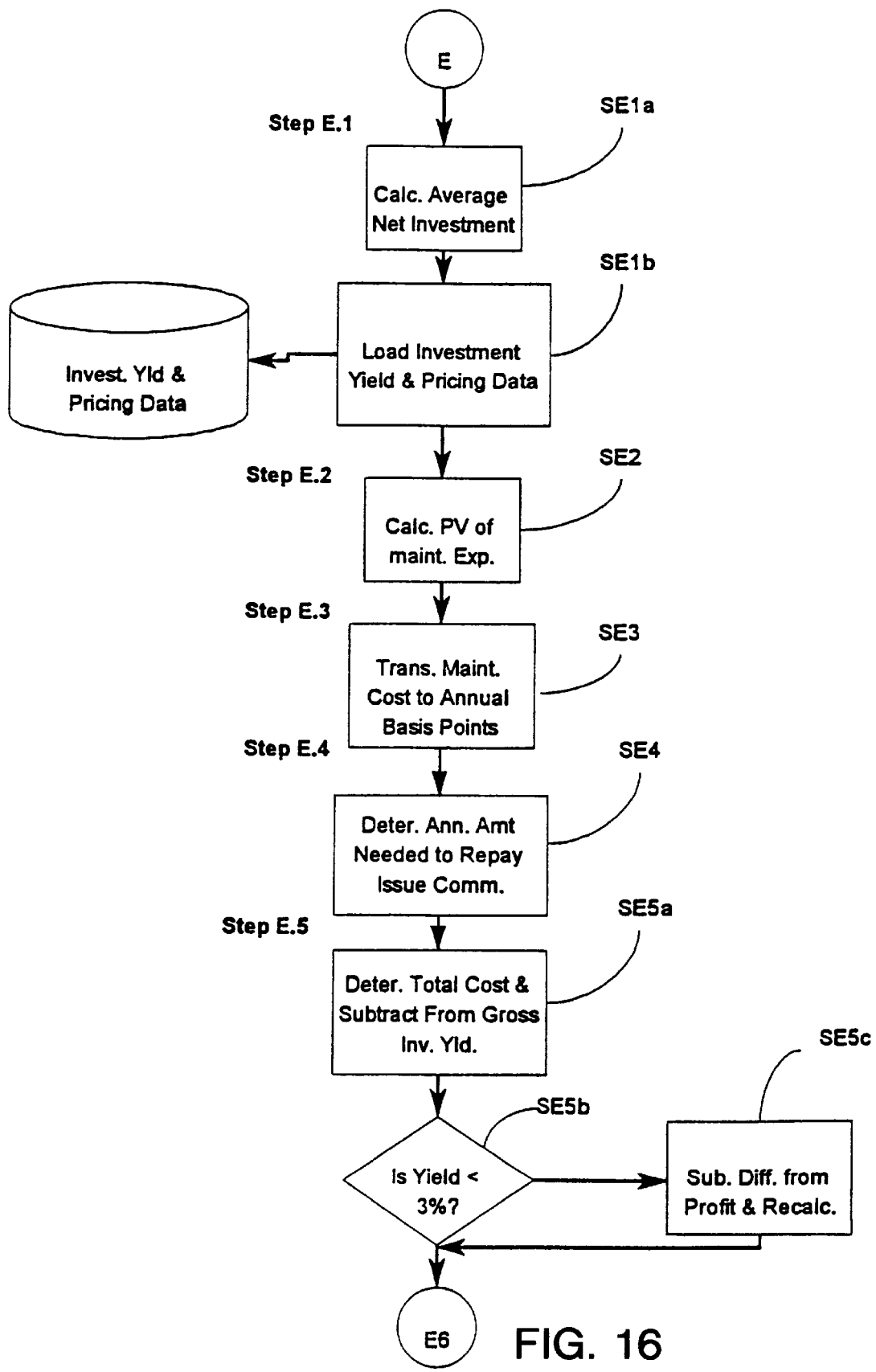
FIGS. 16–17 are flowcharts of the calculation procedure for option E of the annuity system of the present invention.
Figure 17:
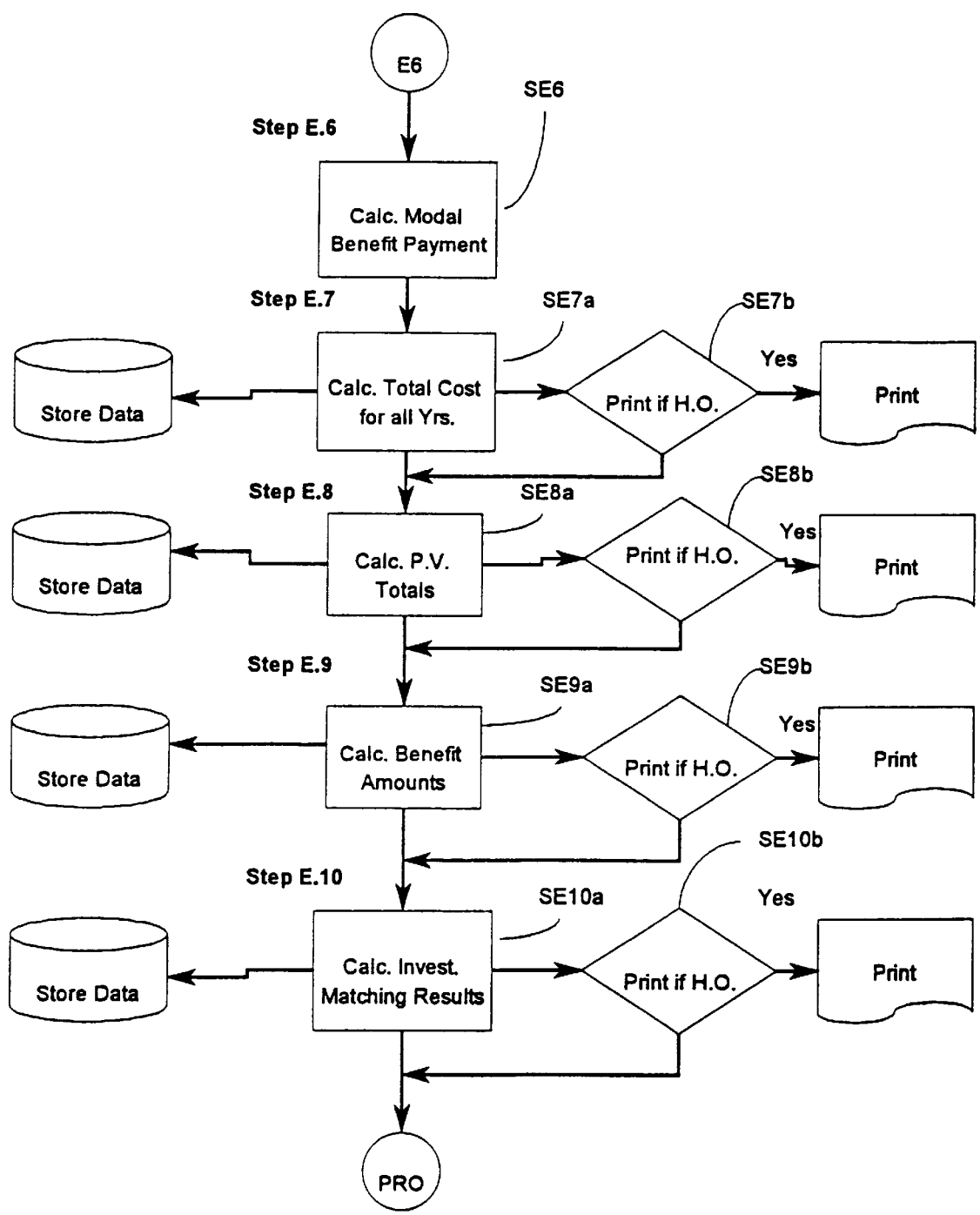

FIGS. 16–17 are flowcharts of the process for option E, Proceeds at Interest and Flexible Certificates of Deposit (CD), of the annuity system of the present invention which is performed in step P50 of FIG. 6. Thus, instead of using the procedure for Option A–D described in FIGS. 7–11, a different procedure for Option E is used. The detailed description of the process flows for Option E utilizes an example of $100,000 deposit or consideration, with monthly interest benefits paid for twelve years. At the end of the twelve year period the total deposit is returned to the owner. In addition, the pricing parameters mentioned previously also apply.

As shown in FIG. 16, processor 6 determines the average net investment for the CD in step SE1a. In order to determine the net investment, processor 6 subtracts the issue commission and the premium tax from the consideration for the CD to calculate average net investment. Thus, for the example used in Option E, the average net investment is determined as follows:

| | |
|---|---|
| Consideration: | $100,000.00 |
| Less Issue Comm.: | $3,500.00 |
| Less Premium Tax: | $0.00 |
| Aver Net Invest = | $96,500.00 |

After completing step SE1a, processor 6 loads investment yield and pricing data from read/write/delete memory 8 in step SE1b for use in subsequent processing of Option E. In step SE2, processor 6 determines the present value of maintenance expenses. The interest rate discount used for determining the present value of maintenance expenses is based on the estimated total investment yield for the period selected. Thus, the annuity system of the present invention is able to determine the present value of maintenance expenses by selecting from multiple interest rates which are appropriate for the particular investment period and duration. An example of the gross investment yield table used in step SE2 is shown below for the $100,000 example.

| Gross Investment Yield | | | | |
|---|---|---|---|---|
| Benefit Years | Treasury Yield | Add. B. P. | Estimated Yield | MT |
| 5 to 6 | 4.77% | 0.68% | 5.45% | 5 |
| 7 to 10 | 5.03% | 1.25% | 6.28% | 7 |
| 11 to 20 | 5.41% | 1.35% | 6.76% | 10 |
| 21 to 30 | 5.71% | 1.35% | 7.06% | 20 |

In this above example, the yield of 6.76% is used for the 12 year period. Thus, the present value of the maintenance expenses is as follows:

| Year | Maintenance Expense | Discount Rate | Maint. Exp.* Disc'nt Rate |
|---|---|---|---|
| 1 | $140.00 | 1.00000000 | 140.0000 |
| 2 | $41.60 | 0.93668040 | 38.9659 |
| 3 | $43.26 | 0.87737018 | 37.9550 |
| 4 | $44.99 | 0.82181546 | 36.9735 |
| 5 | $46.79 | 0.76977843 | 36.0179 |
| 6 | $48.67 | 0.72103637 | 35.0928 |
| 7 | $50.61 | 0.67538064 | 34.1810 |
| 8 | $52.64 | 0.63261581 | 33.3009 |
| 9 | $54.74 | 0.59255884 | 32.4367 |
| 10 | $56.93 | 0.55503825 | 31.5983 |
| 11 | $59.21 | 0.51989345 | 30.7829 |
| 12 | $61.58 | 0.48697401 | 29.9879 |
| 13 | $0.00 | 0.45613901 | 0.0000 |
| 14 | $0.00 | 0.42725648 | 0.0000 |
| 15 | $0.00 | 0.40020277 | 0.0000 |

Note that for year 1, both the maintenance cost of $40 and the issue cost of $100 apply to equal the $140. In addition, the maintenance expenses for subsequent years are calculated using the maintenance inflation rate, in this example, of 4%. The maintenance discount factor is also determined using the estimated yield for the chosen investment period. Thus, the discount factor may generally be determined as follows:

maint. discount rate=$(1/1+\text{estimated yield})^{(maint.\ year)}$

In addition, the discounted maintenance expenses are determined by the maintenance expenses multiplied with the discount rate. Thus, for the above example, for the second year, the maintenance expenses equals $40+0.04*40=$41.60 and the discount equals $(1/1+0.0676)^1=0.93668040$.

After completing step SE2, processor 6 then translates the determined maintenance cost into annual basis points (b.p.). In order to translate the maintenance cost into basis points, processor 6 first considers that a renewal year basis point compensation is paid (25 b.p. in this example), but not in the first year. Thus, an equivalent first year basis point compensation is subtracted from the present value of the maintenance expenses basis points. Thus, in the example, the equivalent first year basis point compensation is $96,500*0.25%=$241.25. The difference between 241.25 and the total discounted maintenance expenses of $517.2928=$276.04 which are the remaining expenses. The remaining expenses ($276.04 in the example) are then divided by an annuity factor which is the present value of paying $1 for each year proceeds are paid. That is, the annuity factor is the total of the discount rates over the period of the CD. In this example, the total of all the discount rates for the first twelve years equals 8.58914186. Next, the annual cost is determined as the remaining expenses divided by the annuity factor. In this example, the annual cost is 276.0428495 divided by 8.58914186=32.13858312. Finally, the average cost is divided by the net investment to translate the cost into basis points ($32.14/$96,500=0.000333042 b.p. in the example). An example of the presentation of the above information is indicated below:

| Maintenance Basis Points | |
| --- | --- |
| Aver Net Invest = | $96,500.00 |
| Times b.p.: | 0.25% |
| | 241.25 |
| Cost of Maint: | 517.2928 |
| Remaining Exp.: | 276.0428495 |
| Factor: | 8.58914186 |
| Annual Cost: | 32.13858312 |
| Annual Cost in b.p: | 0.000333042 |

After performing step SE3, processor 6 determines the annual amount needed to repay the issue commission in step SE4. An amount in basis points is calculated that will accumulate a fund to repay the issue commission at the end of the period selected. The total commission to be repaid at the end of the period is discounted back to issue. This present value amount is then divided by the annuity factor of $1 paid each year for the period. This average annual cost ($185.87 in this example) is then divided by the net consideration to produce an equivalent basis point figure. The following information was determined for the above example.

| Repay Issue Commission | |
| --- | --- |
| Acq Cost | $3,500.00 |
| Discount Years | 12 |
| Discount Factor | 0.456139013 |
| P.V. of Comm. Cost | 1596.486546 |
| $1 Annuity Factor | 8.58914186 |
| Annual Cost | 185.8726486 |
| Equivalent B.P. | 0.001926141 |

Next, processor 6 determines the total cost in basis points and subtracts the total cost in basis points from the gross investment yield in step S5. Processor 6 adds together the total charges (in basis points) and subtracts them from the gross investment yield. This net investment yield is then multiplied by the ratio of the net consideration to the total consideration to generate the yield to the customer. An example of the total cost in basis points is displayed below:

| Total Charges | |
| --- | --- |
| Gross Investment Yield | 6.7600% |
| Total Charges (in b.p.) | 1.8759% |
| Net Investment Yield | 4.8841% |
| Ratio Net Cons'd/Cons'd | 0.965000 |
| Net Inv. Yield to Customer | 4.7131% |

If the yield to the customer is less then the minimum guaranteed yield, for example 3%, processor 6 back calculates the allowable costs that will produce the guaranteed yield. The difference in costs is subtracted from the projected profit and surplus charge. The calculation from gross investment yield to customer yield is then reproduced. An example of this scenario is displayed below. However, since the customer received a yield greater than the guaranteed yield of 3%, no alteration or reduction to costs was necessary to provide the guaranteed yield.

| Guaranteed Yield | | | |
| --- | --- | --- | --- |
| | Initial Rate | Final Rate | |
| Maint. Cost | 0.0333% | 0.0333% | |
| Rnw'l Comm. % BP | 0.2500% | 0.2500% | |
| Inv. & Risk Chrg % BP | 0.4000% | 0.4000% | |
| Profit & Surplus Charge | 1.0000% | 1.0000% | 0% Adj. to |
| Accum of Aqc. Cost: | 0.1926% | 0.1926% | Profit |
| Total Charges | 1.8759% | 1.8759% | |
| Inv. Rate on Net Cons'd | 4.88% | 4.88% | |
| Net Inv. Rate on Cons'd | 4.71% | 4.71% | |

After completing step SE5, processor 6 then determines the modal benefit payment in step SE6. Processor 6 converts the annual net investment interest rate to a modal rate (i(m)/m), where $i(m)/m=(1+i)^{(1/m)}-1$.

If the customer selects a settlement option (SO), payments are made at the start of the benefit period, so the modal interest rate must be discounted to the start of the year, by dividing the modal interest rate by (1+i(m)/m). The resulting rate times the gross consideration produces the modal benefit payment. The modal benefit payment is shown below for the example used for Option E.

| Modal Benefit Payment | |
| --- | --- |
| Annual Interest | 4.7131388% |
| Payments per Year | 12 |
| Mode Int.: | 0.3845242% |
| [If S.O. Discount Interest] | |
| 1 = S.O., 2 = SPIA | 1 |
| Disc' to Start of period | 0.3830513% |
| Times Consideration | $100,000.00 |
| Mode Payment: | $383.05 |

The projected value of all payments made during the year, based on the net investment rate equals the consideration times the annual net investment rate. Thus, for the above example, Proj't V. of Ann. Pay'ts=$4,713.14=4.7131388%*100,000

Processor 6 next determines the total cost of the CD for all years in step S7a. This determination is based on the net consideration times the cost (in basis points) as previously developed in steps SE1–SE6. A sample compilation of the determinations made by processor 6 is displayed below.

| YR | A | B | C | D | E | F | G | H | I |
| --- | --- | --- | --- | --- | --- | --- | --- | --- | --- |
| 1 | 96,500 | 4,713.14 | 32.14 | 185.87 | 241.25 | 386.00 | 965.00 | 6,523.40 | 6,523.40 |
| 2 | 96,500 | 4,713.14 | 32.14 | 185.87 | 241.25 | 386.00 | 965.00 | 6,523.40 | 6,523.40 |
| 3 | 96,500 | 4,713.14 | 32.14 | 185.87 | 241.25 | 386.00 | 965.00 | 6,523.40 | 6,523.40 |

-continued

| YR | A | B | C | D | E | F | G | H | I |
|----|------|--------|-------|--------|--------|--------|--------|----------|----------|
| 4  | 96,500 | 4,713.14 | 32.14 | 185.87 | 241.25 | 386.00 | 965.00 | 6,523.40 | 6,523.40 |
| 5  | 96,500 | 4,713.14 | 32.14 | 185.87 | 241.25 | 386.00 | 965.00 | 6,523.40 | 6,523.40 |
| 6  | 96,500 | 4,713.14 | 32.14 | 185.87 | 241.25 | 386.00 | 965.00 | 6,523.40 | 6,523.40 |
| 7  | 96,500 | 4,713.14 | 32.14 | 185.87 | 241.25 | 386.00 | 965.00 | 6,523.40 | 6,523.40 |
| 8  | 96,500 | 4,713.14 | 32.14 | 185.87 | 241.25 | 386.00 | 965.00 | 6,523.40 | 6,523.40 |
| 9  | 96,500 | 4,713.14 | 32.14 | 185.87 | 241.25 | 386.00 | 965.00 | 6,523.40 | 6,523.40 |
| 10 | 96,500 | 4,713.14 | 32.14 | 185.87 | 241.25 | 386.00 | 965.00 | 6,523.40 | 6,523.40 |
| 11 | 96,500 | 4,713.14 | 32.14 | 185.87 | 241.25 | 386.00 | 965.00 | 6,523.40 | 6,523.40 |
| 12 | 96,500 | 4,713.14 | 32.14 | 185.87 | 241.25 | 386.00 | 965.00 | 6,523.40 | 6,523.40 | where A: Start of year reserve
  B: Expense benefits payment
  C: Maintenance expenses
  D: Accumulation of acquisition costs
  E: Renewal commission
  F: Investment expenses and risk charges
  G: Surplus and profits
  H: Total payments
  I: Interest on net investment.

The above information may also be printed in the Home Office in step SE7b.

After completing step SE7a, processor 6 discounts the benefits, expenses and interest on net investment values to the date the CD is issued and the discounted values are totaled in step SE8a. The discount factor is the estimated gross investment yield (given in Step E.2). A sample of the information is displayed below.

| Category | Present Value |
|----------|---------------|
| Expect. Benefit Payments | $37,918.54 |
| Maintenance Expense | $258.56 |
| Accumulation of Acq. Cost | $1,495.40 |
| Renewal Commission | $1,940.92 |
| Investment Exp. & Risk Charge | $3,105.48 |
| Surplus & Profit Charge | $7,763.70 |
| Total Benefits & Expenses | $52,482.59 |
| Interest on Net Investment | $52,482.58 |

The present value of all benefits and expenses may be displayed in step SE8b to confirm that the process is in balance.

After completion of step SE8a, processor 6 groups together the modal benefit, total benefit payments and total yield on investment for the consumer on display 12 in step SE9a and displays this information for the Home Office upon request in step S9b. In the above example, the Home Office will view the following:

| Initial Mode Benefit Monthly | Total Certain Payments |
|------------------------------|------------------------|
| $383.05 | $55,159. |

Total Certain Yield
4.71%

Next, in step SE10, processor 6 determines the investment matching results which instructs the Home Office as to the appropriate investment by investment period. Thus, the present invention provides an investment matching schedule in step SE10 to inform the company providing the CD with the necessary interest rates which must be obtained by the company on investments to support or finance the interest return on the CD. A sample investment matching table is shown below:

| Investment Matching | | |
|---|---|---|
| Estimated Yield | Benefit Years | Amount of Purchase |
| 5.45% | 5–6 | 0 |
| 6.28% | 7–10 | 0 |
| 6.76% | 11–20 | 96,500 |
| 7.06% | 21–30 | 0 |

Finally, once processor 6 performs step SE1–SE10, processor 6 then performs the proposal presentation procedure described in FIG. 14. A sample of the CD proposal which is generated for the customer is shown in FIG. 18.

Update Code Confirmation

In addition to the above procedures for Options A–E, the present invention also provides the feature of updating the various customer location annuity systems 2 with the appropriate investment yields for the appropriate investment duration using an update code confirming process. One method of updating investment yields and duration spreads is to calculate and distribute a hard copy rate change notice on a weekly basis from the Home Office System 4 to each of the customer location annuity systems 2. As part of this update, an "Update Code" may be displayed. The update code is determined based on, for example, the update date and each of the estimated Gross Yield figures. When data on a PC is updated, the Update Code is also keyed in, and if it matches the update code determined in the process, an "Update O.K." message is displayed. If not, the data which has been input must be corrected. One example of this update procedure is described below.

| Update Code Confirmation | |
|---|---|
| 11/10/93 | Current Date |
| 1/1/90 | Subtract from January 1, 1990 |
| 1,409.00 | Result |
| 763.0416 | Maturity (M)1 Gross Yield (GY) + M30 GY*10,000 |
| 3,700.00 | (M3 GY + M20 GY) * 1,000,000 –120,000 |
| 645.0575 | M5 GY + M7 GY * 10,000 |
| 92.9300 | (1 – M10 GY) *100 |
| 6,610.029 | Update Code (sum of all above numbers) |

In addition to the above example, a termination date for the effective period of investment yields may also be included in the update code confirmation process. Further, prior to the issuance of an annuity policy or CD, a check loop might also be included which would involve processor 6 transmitting the update code back to the Home Office System 4 to verify that the update code used on the proposal was the correct code.

Advance Probability Calculations

The process as described contains numerous probable figures that are best estimates of actual future costs or events. These estimates include:

a. Mortality rates and improvement factors.
b. Future maintenance expense and expense inflation factors.
c. Investment expense and risk factors.
d. Gross reinvestment rates (for the current process these are set equal to the original gross investment rate for each particular "Block of Years").

Each of these figures has a unique probability distribution, and there is often a link between the value of one variable and that of the next in a sequence. For example, a person in exceptionally good health would have a lower then average mortality rate over a number of years, and all of the probability distributions would be skewed toward the lower range of 1000Qx values. The process could be expanded to run numerous standard Monte Carlo Simulations using random numbers to generate test values for each factor based on the specific probability distributions. By running multiple simulations, a distribution of initial mode benefit payment amounts will be produced and the insurance company (or bank) can establish the benefit amount offered to a customer based on probable future profit being greater then or equal to the profit goal specified at least xx % of the time.

Of course, this type of result is only as good as the probability distributions established for the selected variables. Thus, one of the first variables that should be addressed in this fashion would be the gross investment rates on reinvested earnings since this factor is one of the most important factors which determine the cost of the proposal to the customer. Next in line would likely be the mortality rate and improvement factors.

Home Office Reserve Calculation

The reserve described in the process can best be described as the "Natural Benefit and Expense Reserve." The insurance company home office will need to calculate reserves on two or three different basis:

a. Statutory Reserves. This reserve is required by state and is typically determined using the benefit amounts and options selected using a more conservative mortality table and one interest rate established by statute of the state of issue. All other expense assumptions are typically ignored.
b. Tax Reserve. This is a similar determination as the Statutory Reserve, except the mortality table and interest rate are established by the IRS.
c. Generally Accepted Accounting Principles (GAAP) Benefit and Expenses Reserve. This reserve is similar to the Natural Benefit and Expense Reserve, except more conservative assumptions are typically used for all factors (at the discretion of the valuation actuary). The profit factor is often not explicitly used and profits emerge over time based on actual experience.

The above processes described for Options A–D and E could be modified with the appropriate input factors to calculate the various reserves at the customer locations, bank or insurance company home office, as needed.

Finally, it should be noted that while the above process was described with reference to flow charts 2–11 and 14–17, in essence, the various steps of the present invention are performed in hardware. Accordingly, each step of the present invention typically generates an electrical signal which represents a result of a specific step in the flow charts. Accordingly, the flow charts represent the electrical signals which are generated and used in subsequent steps of the process.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer implemented method of generating an annuity proposal, comprising the steps of:
   (a) storing customer information signals and annuity information signals including pricing parameters and interest rates in a memory;
   (b) a home office system providing updated annuity information signals to a plurality of customer location annuity systems, including updated investment yields for the appropriate investment duration, and ensuring that said updated annuity information signals are correct using an update code; and
   (c) retrieving and processing said customer and updated annuity information signals and generating an annuity proposal.

2. The method of claim 1, wherein said code is determined based on at least the update date and the estimated gross yield figures.

3. The method of claim 1, further including the step of transmitting said update code back to said home office system to verify that the update code used on said annuity proposal was correct.

4. A computer-implemented method of generating an annuity proposal, comprising the steps of:
   (a) storing customer information signals and annuity information signals in a memory;
   (b) determining interest rate discount factors;
   (c) determining a present value at the start of each year in said annuity proposal of each mode payment;
   (d) determining an assumed modal benefit amount for each year;
   (e) determining a present value of assumed benefit payments made in each future year;
   (f) determining preliminary annual cost, preliminary present value, and actual present value of pricing parameters; and
   (g) generating said annuity proposal.

5. The method of claim 4, further comprising the step of determining an assumed initial mode benefit payment excluding expenses.

6. The method of claim 5, further comprising the steps of determining a probable amount of percentage of payments made during a year in which benefits cease; and determining a probability that the benefits cease due to death of the annuitant.

7. The method of claim 6, further comprising the step of determining actual initial reserve and present value charges.

8. A computer-implemented annuity system that generates an annuity proposal, comprising:

an electronic memory that stores customer information signals and annuity information signals;

an electronic processor that processes said customer and annuity information signals and generates an annuity proposal; and wherein said processor is also programmed to generate an investment matching proposal at the time of generating said annuity proposal, where said investment matching proposal includes, by investment period, estimated yield data and purchase amount data, to determine the appropriate investment to support said annuity proposal.

9. The system of claim 8, wherein said processor performs the summation of TOTBENt*$V_t$, where t=s to e, and s is the starting period of the investment block and e is the ending period of the investment block.

10. A computer implemented of generating an annuity proposal, comprising the steps of:

(a) storing customer information signals and annuity information signals in a memory;

(b) determining a present value of maintenance expenses;

(c) converting said maintenance expenses into annual maintenance basis points;

(d) determining a total cost in basis points and subtracting said total cost in basis points from a gross investment yield; and (e) generating a proceeds at interest annuity proposal.

11. The method of claim 10, further comprising the steps of determining an average net investment; determining an annual amount for repaying an issue commission; and determining a modal benefit payment.

* * * * *

UNITED STATES PATENT AND TRADEMARK OFFICE
CERTIFICATE OF CORRECTION

PATENT NO. : 6,064,969

DATED : May 16, 2000

INVENTOR(S) : Charles R. Haskins

It is certified that error appears in the above-identified patent and that said Letters Patent is hereby corrected as shown below:

ON THE COVER PAGE

Item [56], References Cited, U.S. Patent Documents:
"3,634,669  1/1972  Soumas et al." should read -- 3,634,669  1/1971  Soumas et al. --

Other Publications:
Please insert the following reference which was omitted from the printed patent:
"Playing With Interest Rates", Law Office Technology Review, September 04, 1992, V.2 NO. 9-1, dialog file 636, Accession No. 01604186, 1992".

Item [57], Abstract, line 9, "system, the" should read -- system of the present invention, --.

UNITED STATES PATENT AND TRADEMARK OFFICE
CERTIFICATE OF CORRECTION

PATENT NO. : 6,064,969

DATED : May 16, 2000

INVENTOR(S) : Charles R. Haskins

It is certified that error appears in the above-identified patent and that said Letters Patent is hereby corrected as shown below:

IN THE CLAIMS

Claim 8, Col. 33, line 11, "investment" should read -- investments --.
Claim 10, Col. 33 line 17, "implemented of" should read -- implemented method of --.

Signed and Sealed this

Fifteenth Day of May, 2001

NICHOLAS P. GODICI

*Attesting Officer*   *Acting Director of the United States Patent and Trademark Office*